United States Patent [19]

Cordova-Plaza et al.

[11] Patent Number: 5,082,349

[45] Date of Patent: Jan. 21, 1992

[54] BI-DOMAIN TWO-MODE SINGLE CRYSTAL FIBER DEVICES

[75] Inventors: Amado Cordova-Plaza, Woodland Hills; Herbert J. Shaw, Stanford, both of Calif.

[73] Assignee: The Board of Trustees of the Leland Stanford Junior University, Stanford, Calif.

[21] Appl. No.: 541,091

[22] Filed: Jun. 20, 1990

Related U.S. Application Data

[63] Continuation of Ser. No. 345,078, Apr. 28, 1989, abandoned, which is a continuation-in-part of Ser. No. 186,045, Apr. 25, 1988.

[51] Int. Cl.[5] .......................... G02B 6/10; G02B 6/28; G02B 6/02; G02B 6/16
[52] U.S. Cl. .......................................... 385/2; 385/16; 385/28
[58] Field of Search ............... 350/96.15, 96.20, 96.29, 350/96.30, 96.31, 96.32, 96.33

[56] References Cited

U.S. PATENT DOCUMENTS

| | | | |
|---|---|---|---|
| 4,669,814 | 6/1987 | Dyott | 350/96.15 |
| 4,679,894 | 7/1987 | Pavlath | 350/96.15 |
| 4,741,586 | 5/1988 | Kim et al. | 350/96.15 |

OTHER PUBLICATIONS

Nosu, et al., "Acousto-Optic Frequency Shifter for Single Mode Fibers," Naval Research Laboratory.
Grabmaier, et al., "Growth and Investigation of Mgo--Doped LiNbO$_3$" *Journal of Crystal Growth*, vol. 79, p. 682, 1986.
Youngquist, "Single-Sideband Frequency Shifting," Ph. D. Thesis: Loss and Periodic . . . Couplers, Chapter 7, Stanford University, Jun. 1984, pp. 79–88.
D. Gloge, "Weakly Guiding Fibers," *Applied Optics*, vol. 10, No. 10, Oct. 1971, pp. 2252–2258.
W. V. Sorin, et al., "Highly Selective Evanescent Modal Filter for Two-Mode Optical Fibers," *Optics Letters*, vol. 11, No. 9, Sep. 1986, pp. 581–583.
R. C. Youngquiest, et al., "All-Fibre Components Using Periodic Coupling," *IEEE Proceedings*, vol. 132, Pt. J, No. 5, Oct. 1985, pp. 277–286.
R. C. Youngquiest, et al., "Two-Mode Fiber Modal Coupler," *Optics Letters*, vol. 9, No. 5, May 1984, pp. 177–179.
J. N. Blake, et al., "Fiber-Optic Modal Coupler Using Periodic Microbending," *Optics Letters*, vol. 11, No. 3, Mar. 1986, pp. 177–179.
B. Y. Kim, et al., "All-Fiber Acousto-Optic Frequency Shifter," *Optics Letters*, vol. 11, No. 6, Jun. 1986, pp. 389–391.
J. N. Blake, et al., "All-Fiber Acousto-Optic Frequency Shifter Using Two-Mode Fiber," *Proceedings of the SPIE*, vol. 719, 1986.

(List continued on next page.)

*Primary Examiner*—Akm Ullah
*Attorney, Agent, or Firm*—Knobbe, Martens, Olson & Bear

[57] ABSTRACT

A mode converter comprises an a-axis LiNbO$_3$ optical fiber exhibiting a ferroelectric bi-domain structure. The fiber is subject to an electrical field that induces a $+\pi/2$ phase retardation in one domain of the fiber and a $-\pi/2$ phase retardation in the other domain. A light signal launched in the fundamental mode of the fiber is converted into a light signal propagating in the second order mode. When the electrical field is selected so that the phase retardations are not multiples of $\pi/2$, the mode conversion is partial and the LiNbO$_3$ fiber can operate as an optical switch or as an amplitude modulator. The mode converter can also be operated as a second harmonic generator. The fiber is heated to a phase matching temperature so that a signal launched in the fundamental mode of the fiber and at a frequency $\omega$ is converted to the second order mode at a frequency $2\omega$. The LiNbO$_3$ fiber can also simultaneously operate as an optical switch and as a second harmonic generator. Other non-linear interactions are possible such as sum or difference frequency generation or parametric generation. The various embodiments of the present invention are reciprocal.

34 Claims, 11 Drawing Sheets

L. Pochhammer, "Über Fortpflanzungsgeschwindigkeiten kleiner Schwingungen in einem unbegrenzten isotropen Kreiscylinder," *Journal fur Reine und Angewandte Mathematik*, vol. 81, 1876, pp. 324–336.

Heismann, et al., "Integrated-Optical Frequency Translator with Stripe Waveguide," *Applied Physics Letter*, vol. 45, No. 5, Sep. 1, 1984, pp. 490–492.

Y. S. Luh, et al., "Ferroelectric Domain Structures in $LiNbO_3$ Single-Crystal Fibers," *Journal of Crystal Growth*, 78, 1986, pp. 135–143.

A. A. Godil, et al., "All-Fiber Acoustooptic Phase Modulators Using Zinc Oxide Films on Glass Fiber," *Journal of Lightwave Technology*, vol. 6, No. 10, Oct. 1988.

Sudo, et al., "$MgO:LiNbO_3$ Single-Crystal Fiber with Magnesium-ion In-Diffused Cladding," *Optics Letters*, vol. 12, p. 938, Nov. 1987.

W. P. Risk, et al., "Acousto-Optic Frequency Shifting in Birefringent Fiber", *Optics Letters*, vol. 9, No. 7, Jul. 1984.

Cordova-Plaza, "$LiNbO_3$, Miniature Lasers and Single-Crystal Fibers", G.L. No. 4277, Edward L. Ginzton Laboratory, W.W. Hansen Laboratories of Physics, Stanford University, Stanford, CA 94305.

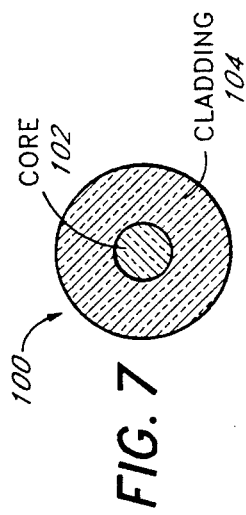
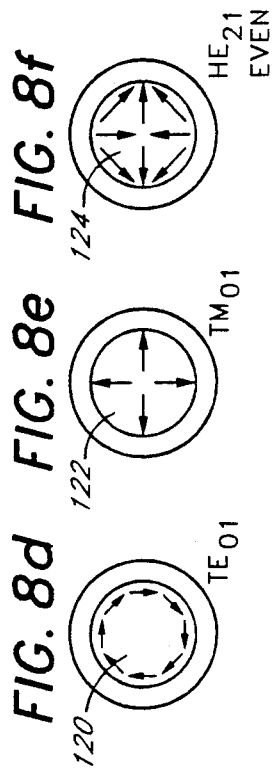
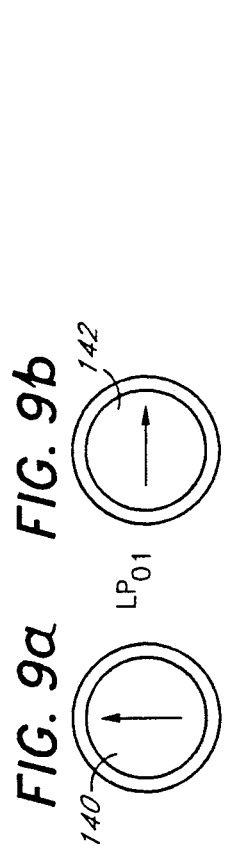
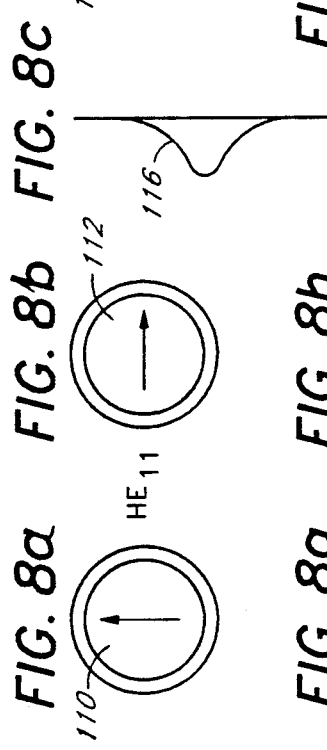

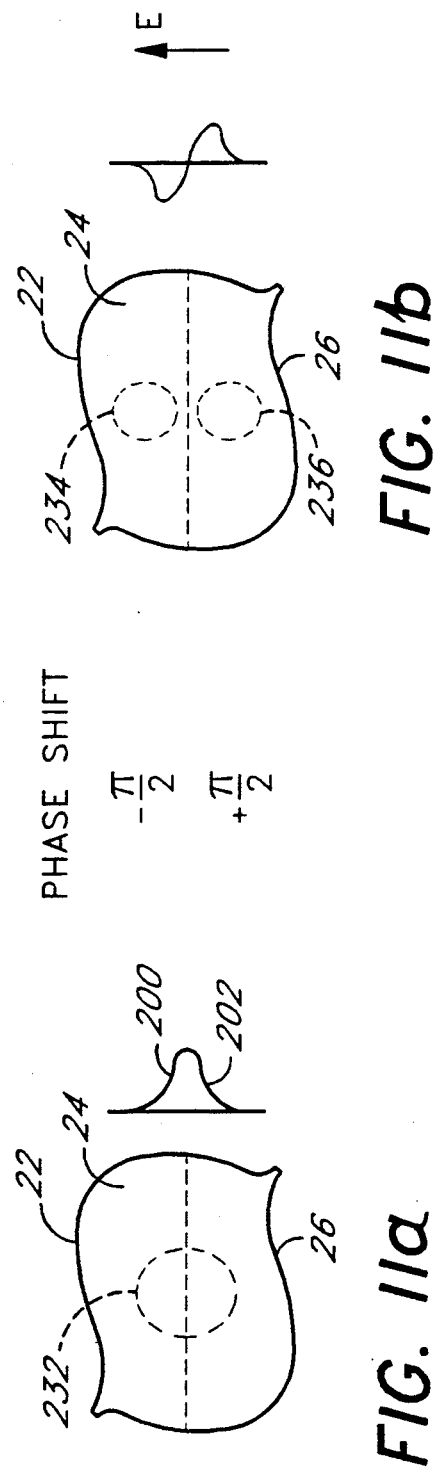

$$\begin{bmatrix} +\frac{\pi}{4} \\ -\frac{\pi}{4} \end{bmatrix}$$

$$\begin{bmatrix} -\frac{\pi}{4} \\ +\frac{\pi}{4} \end{bmatrix}$$

BI-DOMAIN TWO-MODE SINGLE CRYSTAL FIBER DEVICES

RELATED APPLICATIONS

This application is a continuation of application Ser. No. 345,078, filed Apr. 28, 1989, now abandoned which is a continuation-in-part of U.S. patent application Ser. No. 186,045, filed on Apr. 25, 1988 now pending. This application is assigned to the assignee of this application.

FIELD OF THE INVENTION

The present invention relates generally to optical waveguide devices, comprising single crystal optical fibers, and, more particularly, to optical fiber devices which incorporate two-mode optical waveguides to control the propagation of optical energy in the two modes of the waveguide. The present invention thus relates to mode converters, optical switches, optical modulator and frequency converters.

BACKGROUND OF THE INVENTION

An optical fiber is an optical waveguide having a central core surrounded by an outer cladding. The refractive indices of the core and cladding are selected so that optical energy propagating in the optical fiber is well-guided by the fiber.

As is well known in the art, a single optical fiber may provide one or more propagation paths under certain conditions. These propagation paths are commonly referred to as the normal modes of a fiber, which may be conceptualized as independent optical paths through the fiber. Normal modes have unique electric field distribution patterns which remain unchanged, except for amplitude as the light propagates through the fiber. Additionally, each normal mode will propagate through the fiber at a unique propagation velocity.

The number of modes which may be supported by a particular optical fiber is determined by the wavelength of the light propagating therethrough. If the wavelength is greater than a "second-order mode cutoff" wavelength (i.e., the frequency of the light is less than a cutoff frequency), the fiber will support only a single mode. If the wavelength is less than cutoff (i.e., the frequency is greater than the cutoff frequency), the fiber will begin to support higher order modes. For wavelengths less than, but near cutoff, the fiber will support only the fundamental, or first-order mode, and the next, or second-order mode. As the wavelength is decreased, the fiber will support additional modes, for example, a third-order, fourth-order, etc.

Each of the normal modes (e.g., first-order, second-order, etc.) are orthogonal, that is, ordinarily, there is no coupling between the light in these modes. The orientation of the electric field vectors of the modes defines the polarization of the light in the mode, for example, linear vertical or linear horizontal. A more complete discussion of these modes, and their corresponding electric field patterns, will be provided below.

A number of devices have been constructed to utilize the orthogonality of the modes of an optical fiber to provide selective coupling between the modes. For example, co-pending U.S. Pat. No. 4,768,851, entitled "Fiber Optic Modal Coupler," assigned to the assignee of this invention, describes a device which couples optical energy from the first-order mode to the second-order mode, and vice versa. U.S. patent application Ser. No. 048,142, entitled "Fiber Optic Inter-Mode Coupling Single-Sideband Frequency Shifter," assigned to the assignee of this invention, discloses frequency shifters which couple optical energy from one propagation mode to another propagation mode while shifting the frequency of the optical energy. U.S. patent application Ser. No. 820,411, entitled "Fiber Optic Mode Selector," assigned to the assignee of the present invention, discloses a device which separates optical energy propagating in one of the first-order and second-order propagation modes from the other of the first-order and second-order propagation modes.

In the optical fiber manufacturing industry, glass fibers have generally been used for conducting light waves therein. Materials other than glass, however, have also been considered for optical fibers. In particular, single crystal optical fibers, meaning fibers grown from a single crystal and having definite crystal planes, show attractive properties which distinguish them from conventional glass fibers. For instance, Neodymium YAG (yttrium, aluminum garnet) (Nd:YAG) crystals can be formed into both rods and thin fibers. In both forms, the crystal material can amplify light and function as a laser. More recently, lithium niobate crystals have been used to manufacture lithium niobate single crystal fibers. The ferroelectric domain structures of small diameter $LiNbO_3$ single crystal fibers have been investigated in an article by Luh, et al., "Ferroelectric Domain Structures in $LiNbO_3$ Single Crystal Fibers", *Journal of Crystal Growth*, 78, 1986, pp. 135-143. These structures were found to be different from those usually observed in large $LiNbO_3$ crystals. Lithium niobate single crystal fibers have been manufactured using the laser-heated pedestal growth (LHPG) method, a variant of the float zone process. In such a method, the upper end of a source rod of the $LiNbO_3$ crystal material is heated with a focused laser beam. A more detailed description of the methods used for producing such lithium niobate crystal fibers will be provided hereinbelow. More recently, a method for cladding lithium niobate crystal fibers has been described in "$MgO:LiNbO_3$ single crystal fiber with magnesium-ion in-diffused cladding," *Optics Letters*, Vol 12, p. 938, November 1987. The methods for making such claddings for grown single crystal fibers were also disclosed in the aforementioned patent application. This application, U.S. patent application Ser. No. 186,045 filed Apr. 25, 1988 and assigned to Stanford University, is hereby incorporated herein by reference.

The present invention describes new all-fiber electro-optic modulators and other optical devices such as optical switches, of particular importance for modern optical communications and signal processing technologies. Integrated optic circuits, presently used to perform optical modulation and switching, do not exhibit the round geometry of glass fibers and, as a consequence, coupling losses are very high (the best commercially available integrated optic circuits have an insertion loss of 6 dB or higher). Very important fiber optic devices, such as electro-optic fiber modulators/switches and second harmonic generators, cannot be made of glass fibers because of the centrosymmetric properties of glass. As explained in more detail below, the second order nonlinear susceptibility vanishes for glass and makes glass unsuitable for electro-optic applications. On the other hand, single-crystal fibers are naturally compatible with glass fibers, because of their round or elliptical geometry and exhibit excellent electro-optic properties.

SUMMARY OF THE INVENTION

According to a first aspect of the present invention, there is disclosed an apparatus including an optical fiber comprising a material having electro-optic properties, the optical fiber including a first domain and a second domain, the domains collectively supporting a first optical propagation mode and a second optical propagation mode for optical energy propagating in the fiber, the modes corresponding to first and second energy distribution patterns. The apparatus of the present invention further comprises a generator for producing a perturbation in the refractive index of one of the domains relative to the refractive index of the other of the domains of the optical fiber, the perturbation altering the energy distribution of the optical energy to shift at least a portion of the optical energy from one of the patterns to the other of the patterns.

According to a second aspect of the present invention, there is disclosed an apparatus, comprising a single crystal optical fiber, the optical fiber comprising lithium niobate, the optical fiber providing first and second optical propagation modes for an optical signal propagating therein, the first and second optical propagation modes corresponding to first and second energy distribution patterns, the optical fiber further comprising a bi-domain structure partitioning the optical fiber in a first domain and in a second domain. The apparatus further comprises a generator electrically perturbing the refractive index of the optical fiber in the first domain relative to the refractive index of the second domain, the electrically induced perturbation being selected to cause a phase shift of light in the first domain relative to the light in the second domain so that at least a portion of the energy of the optical signal is transferred from one of the energy distribution patterns to the other.

The apparatus preferably comprises a second optical fiber coupled to input light to the optical fiber, the second optical fiber being a single-mode fiber and a third optical fiber coupled to receive light from the optical fiber, the third optical fiber being a bimodal optical fiber. Advantageously, the second and third optical fibers are polarization maintaining fibers.

In a preferred embodiment of the present invention, the perturbational generator comprises an electrical source for applying an electrical field within the single crystal fiber. A plurality of electrodes are preferably placed on the single crystal fiber so as to apply the electrical field to the single crystal fiber. The first and second domains may be substantially of equal volume and are typically determined by the ferroelectric properties of the material of the single crystal optical fiber. The single crystal fiber is preferentially an a-axis grown fiber.

The electric field produced by the electrical source may be selected to induce a $+\pi/2$ phase retardation in the first domain and a $-\pi/2$ retardation in the second domain, so that the amplitudes of the energy distribution patterns in the first and second domains have opposite signs. In a preferred embodiment of the present invention, the first optical propagation mode corresponds to the fundamental mode and the second optical propagation mode corresponds to the second order mode.

The single crystal fiber is preferably oriented so as to use the largest electro-optic coefficient of lithium niobate. In a preferred embodiment of the present invention, the electric field produced by the electrical source induces phase retardations which are odd multiples of $\pi/2$.

The apparatus of the present invention may also comprise an output fiber for receiving light from the optical fiber, the output fiber being connected to one of the first and second domains, the perturbational generator alternatively changing the direction of the perturbation so that the apparatus functions as an optical switch. The second propagation mode typically has at least one lobe and the output fiber is preferably a single-mode fiber sized so that the fundamental mode supported by the output fiber matches the size of the at least one lobe of the second propagation mode. The apparatus of the present invention functioning as an optical switch may further comprise a multimode input fiber for launching the optical signal into the single crystal optical fiber. The switch frequency of the apparatus is typically determined by the perturbational source and is in the GHz range.

The electrical source may induce phase retardations of $\pm\pi/4$ for light in the first and second domains respectively. The electrical source may also selected so as to induce phase retardations selected such that the apparatus operates as an amplitude modulator.

In another preferred embodiment of the present invention, the perturbation produces heat, the single crystal fiber being heated to a phase matching temperature so that second harmonic generation occurs in the optical fiber. In this embodiment, if the optical energy input to the optical fiber is at an input frequency $\omega$, the energy output from the optical fiber is at a frequency twice the input frequency. The perturbational generator may also comprise an AC electrical source so that the apparatus operates as an optical switch. The switch frequency of the apparatus may then be determined by the perturbational generator and may be in the GHz range. In this embodiment, the second propagation mode may have at least one lobe and the output fiber may be a single-mode fiber sized so that the fundamental mode supported by the output fiber matches the size of the at least one lobe of the second propagation mode. It may also comprise a multimode input fiber for launching the optical signal into the single crystal optical fiber.

The electrical field preferably has a voltage given by the following equation for phase retardations equal to $\pm\pi/2$:

$$V = \frac{\lambda}{2n_e^3 r_{33}} \frac{d}{L}$$

The single crystal fiber preferably comprises a longitudinal axis, an a-axis and a c-axis orthogonal to each other, and the longitudinal axis of the single crystal fiber is preferably parallel to the a-axis of the single crystal fiber, the electrical field being collinear to the c-axis of the fiber.

According to another aspect of the present invention, there is disclosed a method of coupling optical energy in an optical waveguide, comprising the steps of providing a single crystal fiber having electro-optic properties, the single crystal fiber comprising a first and a second domain having first and second refractive indices, respectively, the fiber including at least first and second spatial modes in the first and second domains, the first and the second refractive indices being equal when no perturbation is applied within the single crystal fiber and changing differently upon applying a perturbation in the single crystal fiber, inputting a first optical signal having a first frequency into the single crystal fiber, so that the first optical signal propagates in the first mode in the first domain and in the first mode in the second domain, and perturbing the refractive index in the first and second domains to provide an output optical signal propagating at least in the second propagation mode.

The step of perturbing the refractive index preferably comprises the step of applying an electrical perturbation. The method of the present invention may also comprise the step of inducing a $+\pi/2$ phase retardation in the first domain and a $-\pi/2$ retardation in the second domain, so that a total relative phase shift of $\pi$ is obtained between the first and second domains.

It may also comprise the steps of inducing a $+\pi/4$ phase retardation in the first domain and a $-\pi/4$ retardation in the second domain, and alternately changing the direction of the electrical perturbation, so that conversion is partial between the first and second propagation modes, whereby the output optical signal varies in intensity between a maximum and a minimum corresponding to the alternation of the direction of the electrical perturbation.

Preferably, the method of the present invention also comprises the step of selecting phase retardations induced by the perturbation so as to modulate the amplitude of the output optical signal.

It may further comprise the step of heating the single crystal fiber to a phase matching temperature so as to produce second harmonic generation in the single crystal fiber.

According to another aspect, the method of the present invention may comprise the steps of inputting the first optical signal at an input frequency $\omega$ into the single crystal fiber in the first propagation mode; and outputting the optical signal at a frequency twice the input frequency $\omega$ and propagating in the second propagation mode.

These and other advantages and features of the present invention will become more fully apparent from the following description and appended claims taken in conjunction with the accompanying drawings.

BRIEF DESCRIPTION OF THE DRAWINGS

FIG. 7 illustrates an exemplary cross section of a silica optical fiber 100.

FIGS. 8a-8h illustrate the true first-order and second-order modes of a circular core optical fiber and their respective electric field amplitude distributions.

FIGS. 9a-9f, illustrate the first and second modes represented in accordance with the LP approximations.

FIG. 11a graphically illustrates the light distribution in the LiNbO$_3$ fiber of FIG. 6.

FIG. 11b is a graphic illustration of the LiNbO$_3$ fiber of FIG. 6 subject to an electric field E selected to cause a $\pi/2$ phase shift.

FIG. 13b represents a cross-section of the LiNbO$_3$ fiber of FIG. 12 subject to an electrical field E having the reverse orientation to the electrical field of FIG. 13a.

DETAILED DESCRIPTION OF THE PREFERRED EMBODIMENTS

The embodiments of the present invention preferably comprise crystal fibers comprising a material having electro-optic properties. More particularly, the embodiments of the present invention comprise a LiNbO$_3$ single crystal fiber. Before discussing the specific embodiments of the present invention, a brief review of methods for manufacturing such fibers will be provided below so as to provide a more complete understanding of the present invention.

LiNbO$_3$ Single Crystal Fibers

As mentioned above, single-crystal optical fibers offer capabilities that conventional glass fibers cannot provide. One of the great interests of LiNbO$_3$ and also MgO:LiNbO$_3$ single-crystal fibers is their potential as in-line fiber optic devices that take advantage of the excellent electro-optic (or acousto-optic) properties of these materials.

The fabrication of a lithium niobate single-crystal fiber device typically include the following steps: growth, annealing and cladding. The fabrication of fully operative lithium niobate fibers also includes the mounting of electrodes on the fiber so as to use the electro-optic properties of the lithium niobate single-crystal fiber. Because of the large dielectric constant of LiNbO$_3$, the electrodes are preferably deposited directly on the curved surface of the fiber. The electrode fabrication process typically includes the following steps: mounting and polishing, wire bonding and testing.

Growth and Processing of Lithium Niobate Single-Crystal Fibers

Figure 1A:
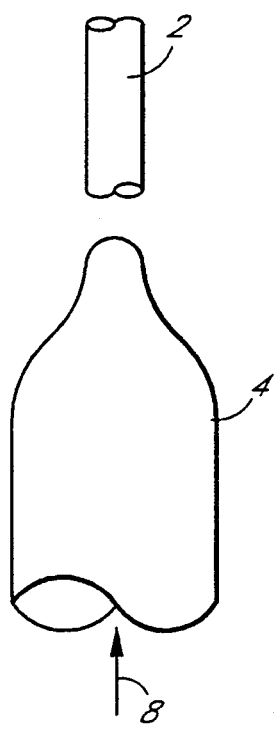
FIGS. 1a and 1b schematically illustrate an embodiment for carrying out the laser heated pedestal growth (LHPG) method used in the present invention to grow LiNbO$_3$ and MgO:LiNbO$_3$ single-crystals.
Figure 1B:
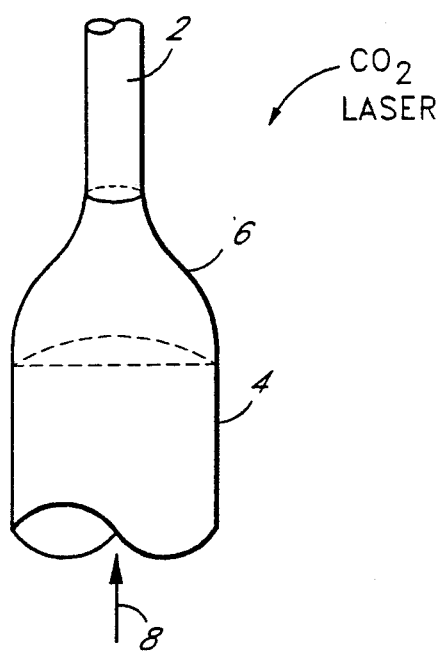

The $LiNbO_3$ and $MgO:LiNbO_3$ single-crystals used in the present invention are preferably grown by the laser heated pedestal growth (LHPG) method. Reference is now made to FIGS. 1a and 1b that schematically illustrate an embodiment for carrying out the LHPG method. An oriented seed 2 is put in contact with a rod of source material, such as a $LiNbO_3$ rod 4. A laser beam, preferably emitted by continuous wave $CO_2$ laser, is symmetrically focused around the source rod 4, producing a molten zone 6. The molten zone 6 is held in place by surface tension. Fiber growth proceeds by simultaneous translation of the source rod 4 and the seed 6, as indicated by the arrow 8 in FIGS. 1a and 1b. The ratio of the diameter of the fiber seed 2 to the diameter of the rod 4 is determined by the ratio of speeds. A diameter reduction 3 to 1 is usually preferred for stable growth. A detailed description of the growth apparatus and the LHPG method can be found in the aforementioned Luh article. This article is hereby incorporated herein by reference.

In the fabrication process of a glass fiber, a glass "preform," containing layers of different refractive indices, is heated up to the softening temperature of the glass. At that point, the glass fiber is grown by drawing it from the preform at constant speed. Because of the high viscosity of glass, the layer structure initially present in the preform can be identically reproduced in the growing fiber. In this way, the glass fiber can exhibit a complicated refractive-index profile. Contrary to glass, crystals exhibit a well-defined phase transition from the solid state to the liquid state. Any layer structure initially present in the source rod would most certainly disappear when melting the material. The problem of providing single-crystal fibers with a cladding structure, i.e., with a particular refractive-index profile, had to be solved by using approaches very different from those used for glass fibers. Two cladding techniques for cladding lithium niobate single-crystal fibers are disclosed in the aforementioned patent application. The first technique provides a graded index profile. The second one results in a step index.

The preferred methods for cladding lithium niobate fibers include the following steps: annealing, lithium equilibration and magnesium in-diffused cladding. Instead of coating the crystal fiber with a glass layer, a cladding can be formed within the fiber by diffusing a dopant into the fiber crystal structure. This method forms a cladding comprised primarily of the same material as the fiber core, resulting in a sturdy, flexible device with little induced stress. The diffusion method produces a cladding where both the ordinary and extraordinary indices of refraction of the cladding are lower than the corresponding indices of the fiber core. The cladding uniformly confines propagating light within the fiber regardless of polarization and the orientation of the crystal planes of the fiber. This method also effectively reduces the core of the fiber, providing a core size smaller than that available from the grown fibers. To relieve stresses induced during growth of fibers, to reduce fiber brittleness and to ensure uniformity of diffusion by eliminating undesired surface irregularities (granules) in the lithium niobate fiber, the fiber is preferably annealed before undergoing the diffusion process. The granules can adversely affect, by slowing or quickening, the diffusion process, resulting in an uneven cladding.

Practically, an alumina-tube oven is preferably used for the annealing of $LiNbO_3$ or $MgO:LiNbO_3$ single-crystal fibers. Alumina is preferably used instead of quartz because of previous undesired results obtained when annealing $MgO:LiNbO_3$ fibers in a quartz oven. In an alternative embodiment using a quartz tube, some samples annealed may acquire a cloudy appearance. This effect could be caused by an impurity diffusing and/or reacting with lithium niobate. Since quartz is slightly porous at high temperatures, an outside impurity could diffuse through the tube walls. Silicon from the tube itself could also be responsible for the observed behavior.

The annealing temperature for lithium niobate fibers $T_p$ is preferably chosen to be 1050° C. Since $LiNbO_3$ loses its ferroelectric single-domain structure at temperatures above the Curie point $T_c$, it is important to keep a reasonably safe margin between $T_p$ and $T_c$. The selection of the annealing temperature preferably takes into account the facts that $T_c$ varies from approximately 1100° C. to approximately 1200° C. depending on lithium and magnesium concentration and that lithium out-diffuses readily at high temperatures.

In a preferred annealing method, the fiber is preferably positioned radially rather than axially in the oven because the radial temperature gradient is typically much less than the radial gradient (typically 0.4° C./cm versus 8° C./cm). The preferred value of the alumina-tube inner diameter is selected to be 5 cm, which is large enough to accommodate the fiber lengths of interest (typically 1 to 2 cm).

To avoid oxygen loss during fiber processing, a constant flow of oxygen is provided. A preferred flow rate flow rate is 1 l/min.

A typical annealing cycle comprises the following steps: heating from room temperature to approximately 1050° C. in one hour, annealing at 1050° C. (variable duration, typically two hours), high temperature cooling from 1050° C. to 570° C. in approximately one hour and free cooling to room temperature. The duration of the high temperature cooling period is particularly important since a fast cooling could lead to sample cracking whereas a slow cooling could cause a solid-state phase transition. The preferred cooling rate of (1050-570)° C./1 hour in the preferred method corresponds to the typical cooling rate for $LiNbO_3$ waveguides of 8° C./min.

One of the advantages relating to the annealing of the fibers resides in that the annealing process releases the stress induced during growth, and thus, eliminates the fiber brittleness.

The annealing of the surface of the fibers at 1050° C. is also particularly advantageous as it also eliminates surface granularity. It is currently believed that these granules consist mainly of lithium oxide, $Li_2O$, that evaporates from the molten zone (designated by the numeral 6 in FIG. 1b) during growth and condenses onto the cooler sections of the growing fiber. However, as the sublimation point of $Li_2O$ is 1200° C., close to the processing temperature $T_p$ of 1050° C., it appears that the processing of the fibers at 1050° C. drastically reduces these granules.

When processing at high temperature, lithium niobate or related compounds such as Li ions out-diffuse readily. Lithium deficiency is not as critical as oxygen deficiency. However, material properties such as the Curie temperature strongly depend on the exact lithium concentration. A standard procedure used in the prior art to avoid lithium out-diffusion during fiber growth or processing is to include water vapor in the oxygen flow (wet oxygen). However, the use of wet oxygen appears to cause a slight yellowish coloration in the single crystal fiber. A dry-$O_2$ annealing is thus preferable as it does not yield this yellowish coloration. It is believed that the yellowish coloration only appears during the simultaneous occurrence of a sample doped with MgO, water vapor and alumina. It seems that a reaction between water vapor, $Al_2O_3$ and Mg, probably releasing Al, is responsible for this behavior.

In the preferred method, the processing step of each fiber is performed in a dry-$O_2$ instead of a wet-$O_2$ atmosphere. However, to prevent excessive lithium out-diffusion, a lithium-rich environment is preferably provided.

In the preferred method, the fiber is placed in platinum foil, suspended above lithium-rich powder (a mixture of $Li_3NbO_4$ and $LiNbO_3$). During the processing, an equilibrium is established between the sample and the powder via vapor transport. This process is called vapor-phase equilibration (VPE). The lithium-rich niobate powder replenishes any lithium which diffuses from the fiber during heating.

Another method for eliminating granules on the surface of a lithium niobate fiber comprises dipping the fiber into a bath of warm water, preferably at a bath temperature in the range of approximately 50° to 100° C., until the granules dissolve. This method could be used in conjunction with the annealing step to relieve stress in the fiber and to reduce its surface granularity.

Simple, reliable claddings and methods for making such claddings are indispensable for the manufacture of useful single-crystal fibers. Providing single-crystal fibers with a cladding layer is thus essential, primarily to reduce the surface scattering loss, and second, to decrease the fiber V-number and the mode size, so that it can be directly integrated into a single-mode optical fiber circuit. Surface scattering due to imperfections such as diameter variations induces strong coupling into higher order modes and seems to be the main loss-mechanism in single crystal-fibers. Nd:YAG fiber lasers clad by extrusion exhibit much lower cavity round-trip loss than their unclad counterparts. Theoretical calculations indicate that the surface scattering loss in a $LiNbO_3$ single-crystal fiber can be reduced by three orders of magnitude if the refractive index step at the core-cladding interface is reduced from 0.7 to 0.01.

Glass cladding has been be successfully implemented in Nd:YAG fibers because glasses can be found whose refractive index matches that of YAG. However, for $LiNbO_3$ there are no glasses of sufficiently high refractive index. An additional disadvantage of glass cladding by extrusion is that it does not reduce the effective core size as a diffused cladding does. As discussed above, two methods have been proposed and disclosed in the aforementioned U.S. patent application. The first method consists in cladding by Mg in-diffusion. This method typically comprises depositing a layer of dopant material on the surface of the fiber. For lithium niobate, the preferred dopant material is magnesium oxide (MgO). The deposition can be performed in a standard evaporative coater, such as those used for optical coatings.

The magnesium in-diffusion method is particularly advantageous over extrusion methods as it first reduces the refractive index of $LiNbO_3$. Furthermore, the diffusion coefficient of magnesium in $LiNbO_3$ at temperatures above 1000° C. allows significant ion penetration (tens of μm's) over periods of a few days. The annealing process described above is all the more advantageous as it eliminates the surface granules which could affect (slow down or enhance) the MgO diffusion in certain areas and therefore yields a uniform index profile.

In a preferred method, after the annealing process is terminated, a layer of MgO is uniformly deposited around the fiber. This deposition is performed in a vacuum evaporation station. The fiber is preferably mounted in a capillary tube and is rotated at uniform speed. The fiber spins suspended over the MgO evaporative source, which may consist of an electron beam or other evaporation deposition device. Turning the fiber ensures a uniform deposition.

The MgO layer thicknesses utilized are preferably 0.2, 0.6, 0.9, 1.0 and 2.0 μm. However, the layer thickness does not seem to have a significant influence on the resulting cladding, as long as the Mg-ion source remains undepleted. Preferably the cladding layer is about 0.6 μm for a 170 μm diameter fiber, and about 0.2 μm for a 50 μm fiber.

The next step, namely, Mg in-diffusion, is performed under the same conditions as the annealing step. The dopant is then diffused into the fiber during a second thermal cycle. The fiber is placed in the same oven used in the annealing step and the temperature is raised uniformly from 50° C. to about 1050° C. This step is followed by a diffusion step of duration $T_D$. The diffusion time $T_D$ is chosen depending on the desired diffusion depth, according to the diffusion coefficient reported in the prior art. The diffusion time for the single-crystal fibers of the present invention typically range from 10 to 60 hours. For a 24 μm diffusion depth in thick fibers, 40 hours is a sufficient time. For diffusion depths comparable to the fiber radius, diffusion occurs more rapidly due to the round geometry of the fiber.

Figure 2A:
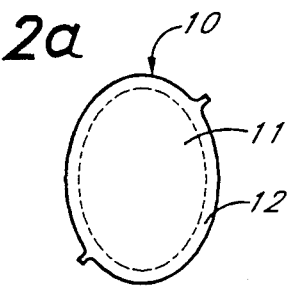
FIGS. 2a and 3a show a LiNbO$_3$ dopant-diffused fiber grown in accordance with the present invention.
Figure 2B:
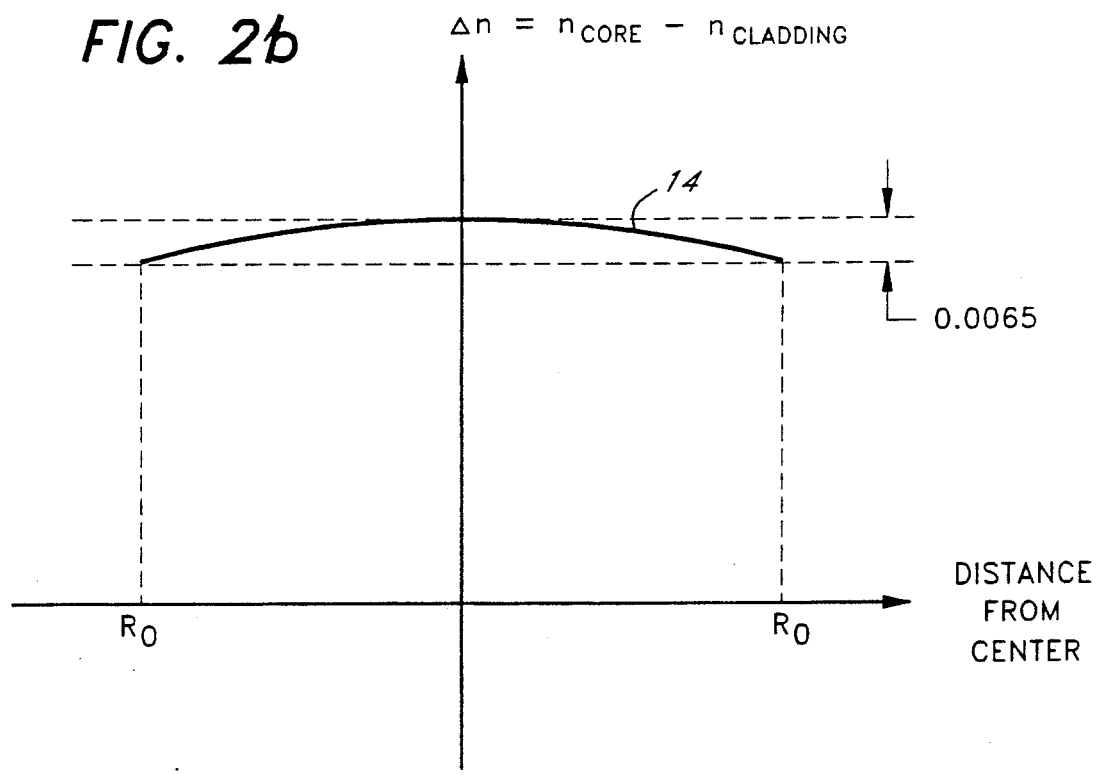
FIG. 2b graphically represents the graded index profile of a LiNbO$_3$ dopant-diffused fiber grown in accordance with a first method of the present invention.
Figure 3A:
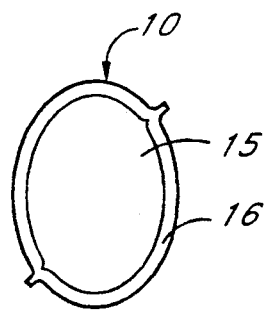

FIGS. 2a and 3a show the dopant-diffused fiber. FIG. 2a shows a fiber 10 in cross section, the shading 12 indicating the relative concentrations of the magnesium oxide dopant. The shading 12 is less marked in the central region 11 of the fiber 10 as less magnesium has diffused towards the center of the fiber. The magnesium oxide reduces both the ordinary and extraordinary indices of refraction of the lithium niobate material in proportion to the MgO concentration. An index profile, applicable to both indices of refraction, across both principal axes of the fiber cross-section, is represented in FIG. 2b by the curve 14. The indices vary approximately parabolically, decreasing along the radius of the fiber outwardly from the center of the fiber to the periphery of the fiber at distance $R_o$, $R_o$ being the radius of the fiber. Typically, the variation of the difference of index between the core and the cladding is in the range of 0.0065 as shown in FIG. 2b.

The MgO concentrations within the fiber are preferably between 1 and 8 mole percent (1 mole percent being 0.01 moles of MgO to 1 mole of lithium niobate) to obtain the graded-index type of cladding. Concentrations of MgO less than 1 mole percent change the refractive index less than 0.001, ailing to create a usable cladding. The change in refractive index for the ordinary polarization due to the MgO dopant within the lithium niobate crystal is approximately 0.0018 for 1 mole percent MgO.

It should be noted that a thin layer of MgO may remain on the fiber surface after diffusion. This layer can be detected by microscope examination or, in certain fibers, by measuring the Mg concentration profile with a microprobe. This observation indicates that the diffusion is of the constant-source or undepleted-source type.

It has been discovered that lithium niobate single-crystal fibers clad by the Mg in-diffusion technique also exhibit at their periphery a layer seemingly having optical properties different from those of the fiber center or fiber core. This peripheral or new layer can be easily identified under microscope observation of a polished fiber end-face. The peripheral layer is typically darker than the central region.

In many fibers exhibiting a thin new layer, the edges are chipped at the boundary between the two regions, and portions of the new layer are off. This breaking or chipping suggests that the new layer is more brittle than the central region. When the layer thickness is increased and an improved polishing procedure is performed typically using a very fine grit (0.3 µm grit) for extended periods of time (a few hours), a good end-face optical quality can be achieved in such fibers including the new layer. The new layer contains a high mol-percentage of Mg. In addition, contrary to the core or central region where the Mg concentration profile is graded, the new layer contains a fairly uniform Mg concentration. However, the exact Mg concentration varies slightly from fiber to fiber, ranging typically in the fibers obtained in the present method from about 19% to about 29%, depending on conditions discussed below. Because of the high concentration of Mg with respect to that of the $LiNbO_3$ phase (fiber core), the new layer is referred to as the Mg-rich layer or Mg-rich phase and this cladding method as "Mg-rich cladding method."

In the Mg concentration profile of an a-axis MgO:-$LiNbO_3$ fiber (a-axis is a selected crystalline axis) obtained in the preferred method, the Mg concentration is close to 100% at the surface indicating that the initial MgO layer, deposited around the fiber, remains undepleted. From the fiber edge to a depth of about 7 µm, the Mg concentration is uniform and approximately equal to 20 mol %. At 7 µm, the Mg concentration drops to the solubility limit of Mg in $LiNbO_3$, i.e., 7.2 mole % or 8 mole %. Such Mg concentration profile results in a step index profile. It also appears that the MgO composition of the Mg-rich layer along the c-axis of the fiber is slightly different from that along another crystalline axis designated as the y-axis. The MgO composition depends also on the fiber growth orientation (c or a-axis).

The Mg-rich layer formation is a diffusion process that takes place simultaneously as the Mg diffusion occurring in the $LiNbO_3$ phase. As long as the source of Mg ions remains undepleted, the thickness of the layer increases with time. Different Mg-rich layer thicknesses can be obtained with different diffusion times.

The layer thicknesses exhibit an almost linear dependence with diffusion time, rather than the square root dependence typical of a linear diffusion process. The Mg-rich formation process is highly dependent on the Li content of the fiber. Fibers exhibiting the Mg-rich layer are preferably processed at high temperatures in a Li-rich environment. This includes fiber annealing (typically two hours) and Mg in-diffusion (10 to 60 hours). As described above in connection with the annealing step, the fibers are first preferably suspended on a boat, above a mixture of $LiNbO_3$ and $Li_3NbO_4$ (Li-rich powder). This vapor equilibration process (VPE) provides the fibers with a stoichiometric lithium composition (same mole percentages of lithium and niobium).

Recent material studies realized on the Mg-rich layer and published in an article by Sudo, et al., in "Uniform Refractive-Indexed Cladding for $LiNbO_3$ Single Crystal Fibers," *Optics Letters*, (to appear) indicate that at least one of the components of this layer is a new compound. This compound may be the "X-compound" reported by Grabmaier and Otto in "Growth and Investigation of MgO-doped $LiNbO_3$", *Journal of Crystal Growth*, Vol. 79, p. 682, 1986, and possibly identified as $MgLiNbO_4$. Since the MgO composition in the Grabmaier article is very close to that of the Mg-rich layer of the present invention (19 to 29 mole %), it is possible that the Mg-rich layer is a double phase containing $LiNbO_3$ and the "X" compound.

Figure 3B:
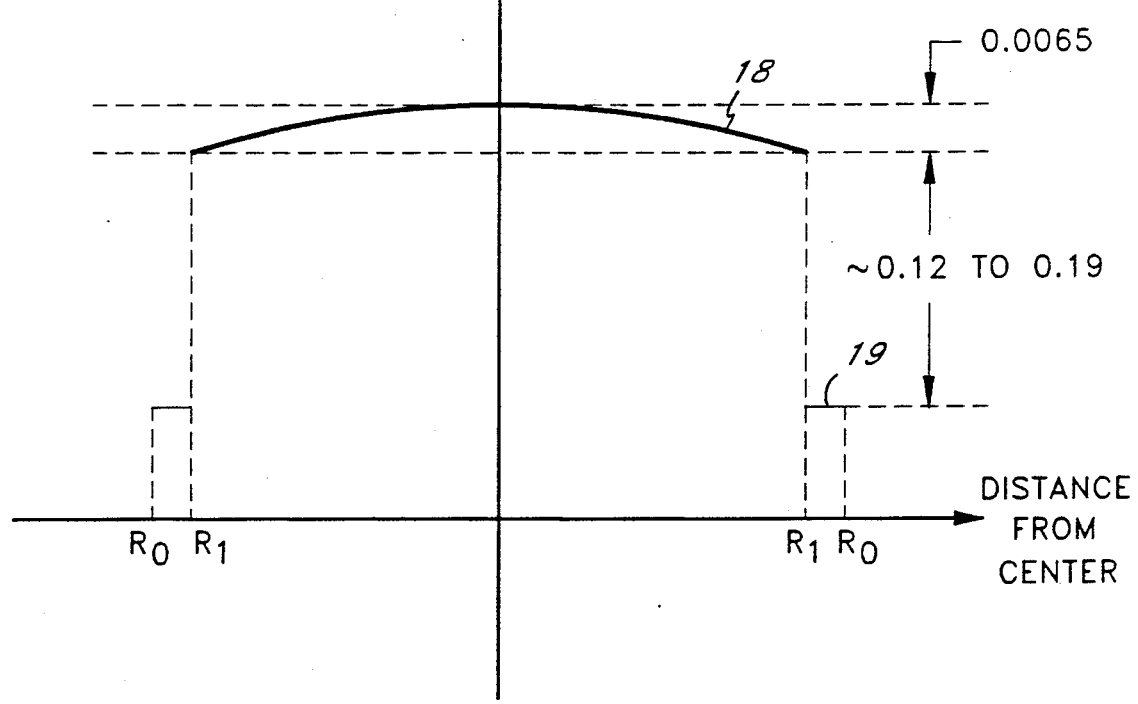
FIG. 3b graphically represents the step index profile of a LiNbO$_3$ dopant-diffused fiber grown in accordance with a second method of the present invention.

An application of the Mg-rich layer is as a cladding layer as the refractive index of the Mg-rich layer is smaller than that of the fiber core (or $LiNbO_3$ phase). The resulting refractive index profile is a step function, like that of most silica fibers used in the modern communications market. A Mg-rich diffused fiber 10 is represented in FIG. 3a. The Mg-rich layer 16 surrounds the inner core region of the fiber 10. The corresponding step-index profile is illustrated in FIG. 3b (curve 18). The variation of the difference of index between the fiber core and the cladding typically has a variation in the order of 0.0065 like the graded index profile shown in FIG. 2a. However at the periphery of the fiber at a distance $R_1$ proximate the periphery of the fiber of radius $R_0$, the difference of index abruptly steps down to a lesser value, typically in the range 0.12 to 0.19, as indicated by the numeral 19. At the MgO-rich layer, the MgO concentration is radially uniform and much higher, approximately equal to 20 mole %. The result is a an outer Mg-rich layer of nearly uniform refractive index 2.08. This uniform index layer will either surround or replace the graded index interior caused by the linear diffusion of the Mg into the fiber's core.

Table 1 illustrates the variation of the thickness of the outer magnesium-rich layer with diffusion time. The example used a 170 µm diameter lithium niobate fiber initially doped with 5% MgO throughout. A predoping of the fiber can be used to accentuate the formation of the Mg-rich step-index layer and also to increase the photorefractive damage threshold of the fiber.

TABLE 1

| Mg-rich Layer Thicknesses for 170 µm $LiNbO_3$ fiber | |
|---|---|
| DIFFUSION TIME | MG-RICH LAYER THICKNESS |
| 10 hours | 2 µm |
| 20 hours | 5 µm |
| 30 hours | 7 µm |
| 40 hours | 9 µm |
| 60 hours | 16 µm |

As mentioned above an advantage of the cladding technique of the present invention is the possibility of reducing the fiber core diameter simply by increasing the diffusion time. In that way, the fiber fundamental mode size can be made equal to that of standard single-mode silica fibers. Launching in or out of the $LiNbO_3$ fiber can thus be accomplished by butt coupling to a silica fiber. On the other hand, because of the large core-cladding refractive index difference (0.12 or 0.19), to reduce the fiber V-number to below 2.405 (single mode operation), the core diameter is preferably very small. Practically, however, it is not necessary to reduce the V-number below 2.405, to attain few-mode propagation over the fiber lengths of the present invention for device applications.

Another application of the Mg-rich phase is to use it in conjunction with the graded Mg-diffused profile previously described. The Mg-rich layer can be seen as the Mg ion source for the linear diffusion occurring in the LiNbO$_3$ phase.

The increase of the layer thickness with time is equivalent to a reduction of the fiber core diameter with time. As a result, the parabolic index profile is sharper and light propagating through that fiber is better confined.

Certain trade-offs occur with the use of the magnesium-rich step-index layer. A too thin cladding layer can crack off (less than about 5% of the fiber diameter). A too thick layer can stress the fiber core to the point where the latter cracks (greater than about 90% of the fiber diameter). One suitable design comprises a 60 micron lithium niobate fiber, where the magnesium rich layer is 15 microns deep, leaving a 30 micron core. The step-index layer is preferably created together with the graded magnesium-diffused (or parabolic) profile already discussed, providing an efficient clad single-crystal fiber with a small core size.

Various modifications can be made to the lithium niobate cladding methods. Surface granularity in the fibers can be minimized by changing the growth direction of the fiber so that the source material is above the molten zone rather than below. Evaporating lithium dioxide material would then tend not to condense upon the growing fiber. Different MgO thicknesses may be used to vary the depth, profile shape and maximum refractive index change.

Different furnaces can be used for the annealing and diffusion shapes. A quartz furnace may be used provided the fiber does not touch the walls so that the fiber does not become white or cloudy. In addition, different powder compositions may be used to arrive at a desired dopant concentration in the fiber. Instead of lithium-rich lithium niobate powder, a congruent powder having the same stoichiometry as the fiber may be used. Or, instead, a lithium-poor powder may be used, to diffuse more of the lithium out of the fiber if desired. The temperatures imposed upon the coated fiber may increase or decrease the MgO diffusion rates into the fiber. The temperature should not, however, exceed the Curie point of the lithium niobate. Above the Curie point, the material loses its ferroelectric domain structure, eliminating its many useful electro-optical properties. The Curie temperature occurs in the range from about 1100° C. to about 1200° C. dependent upon the lithium niobate composition.

Bi-Domain Structure of LiNbO$_3$ Single-Crystal Fibers

A major advantage of LiNbO$_3$ single-crystal fibers obtained by the fabrication methods described above resides in the distribution of the ferroelectric domain structure. In an article published by Y. S. Luh, *Journal of Crystal Growth*, 78, 1986, pp. 135-143, single crystals made of LiNbO$_3$ were investigated and more particularly in regard to their multi-domain structure. This article describes how LiNbO$_3$ single crystal fibers have been grown along both the c-axis and the a-axis with diameters between 100-800 micrometers. A-axis grown fibers appear to show a bi-domain configuration with a domain boundary along the a-axis and parallel to the c-face. This article also mentions that, in order to use LiNbO$_3$ single crystal fibers, it is necessary to prepare single-domain crystals. Poling processes are also described in this article for rearranging the domain structure so as to obtain single-domain crystals, required in the fabrication of LiNbO$_3$ fiber optical devices in accordance with the prior art. This article is clearly concerned with a method of avoiding the use of bi-domain structures in optical fibers having a small diameter. In this article, fibers grown along the c-axis with diameters up to 800 micrometers were found to be virtually single-domain.

The present invention is directed to the use of the bi-domain structure of LiNbO$_3$ single crystal fibers in optical devices, contrary to the belief found in the prior art that LiNbO$_3$ single crystal fibers could not be used unless they had a single-domain structure. The present invention relates to fiber optic devices that exploit the unique bi-domain structure of a-axis LiNbO$_3$ single-crystal fibers. These devices comprise a mode-converter and an optical switch relying on the electro-optic effect inter alia. The speed of these devices is expected to be in the GHz range. In contrast, mode-converters using periodic microbending or traveling acoustic waves are typically limited to the MHz range. Although the bi-domain structure of LiNbO$_3$ single crystal fibers is well described in the aforementioned Luh article (*Journal of Crystal Growth*), a brief summary of the properties of bi-domain LiNbO$_3$ single crystal fibers will allow the person skilled in the art to fully understand the extent of the present invention.

Lithium niobate is a well-known uniaxial crystal belonging to the 3 m point symmetry group. In a uniaxial crystal, one dielectric principal axis must coincide with a distinguished direction, e.g., the z-axis, while the other two axes are perpendicular to the distinguished axis. In an uniaxial crystal, the tensor $\epsilon$ that links the electric field E to the electric displacement D is given by the following matrix:

$$\begin{matrix} \epsilon_x & 0 & 0 \\ 0 & \epsilon_y & 0 \\ 0 & 0 & \epsilon_z \end{matrix}$$

with $\epsilon_x = \epsilon_y$. In an uniaxial crystal, two indices of refraction are defined, the ordinary index of refraction $n_o$ and the extraordinary index of refraction $n_e$. A light beam incident on a plane of a lithium niobate crystal gives rise to two refracted rays lying in the plane of incidence. This is also referred to as the phenomenon of birefringence or double refraction.

Figure 4:
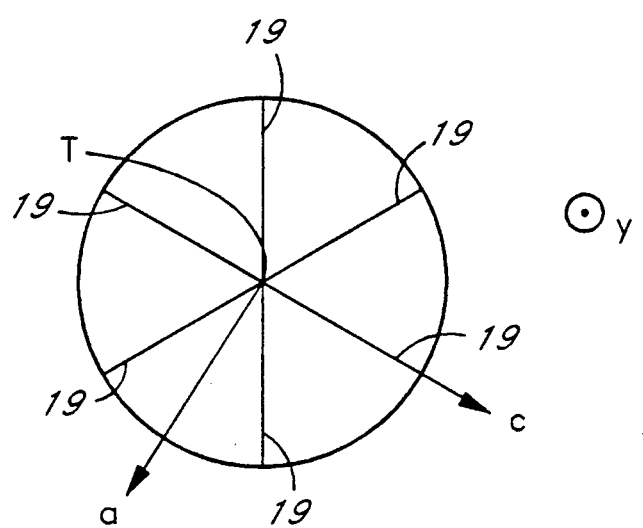
FIG. 4 illustrates the symmetry elements valid in the group 3m of a lithium niobate crystal and more particularly shows one set of three symmetry related mirror planes parallel to a triad T.

Lithium niobate has a unique triad axis and no center of inversion. FIG. 4 illustrates the symmetry elements valid in the group 3 m of a lithium niobate crystal. FIG. 4 shows one set of three symmetry related mirror planes parallel 19 to the triad T. The triad axis T is generally designated as the y-axis (perpendicular to the plane of the drawing sheet in FIG. 4). The a-axis is a nonpolar direction perpendicular to the y-axis and the c-axis. The c-axis is a polar direction lying in a mirror plane. A lithium niobate fiber can be grown along any of these axes.

A complete description of the properties of lithium niobate crystals can be found in "Chemistry and Physics of Lithium Niobate," by Armin Raüber, Current Topics in materials Science, Volume 1, edited by E. Kaldis, North-Holland Publishing Company, 1978. This article is hereby incorporated herein by reference.

Single-crystal fibers of LiNbO$_3$ and MgO:LiNbO$_3$, preferably grown by the laser-heated pedestal method as described above, exhibit a particular ferroelectric domain structure, due to temperature gradient-induced thermoelectric fields during growth. Of interest here are a-axis grown fibers, which exhibit a bi-domain structure with the domain boundary along the a-axis, and perpendicular to the c-axis.

Figure 5:
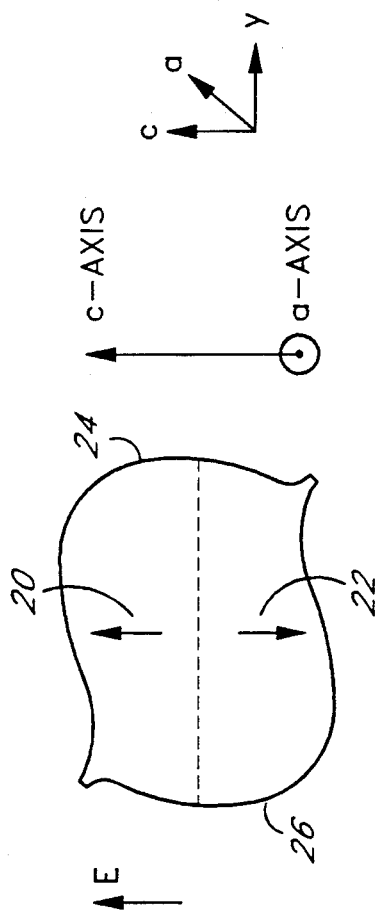
FIG. 5 is a graphic illustration of an a-axis grown fiber exhibiting a bi-domain structure with the domain boundary along the a-axis, and perpendicular to the c-axis, as preferably used in the present invention.

Reference is now made to FIG. 5 which illustrates such a fiber. In FIG. 5, the arrows 20 and 22 indicate the direction of the ferroelectric domains. The ferroelectric vector is collinear with the c-axis. It has a direction indicated by the arrow 20 in the upper domain 24, and has a direction indicated by the arrow 22 in the lower domain 26. The a-axis is perpendicular to the plane of the drawing sheet. Such fibers are referred to as a-axis LiNbO$_3$ fibers. The reversal of the ferroelectric domains across the domain boundary implies a change of sign of parameters associated with the second order nonlinear susceptibility, such as the electro-optic coefficient and the second order nonlinear coefficient. This property is the basis for the devices of the present invention.

Mode Converter Using the Electro-Optic Effect

Figure 6:
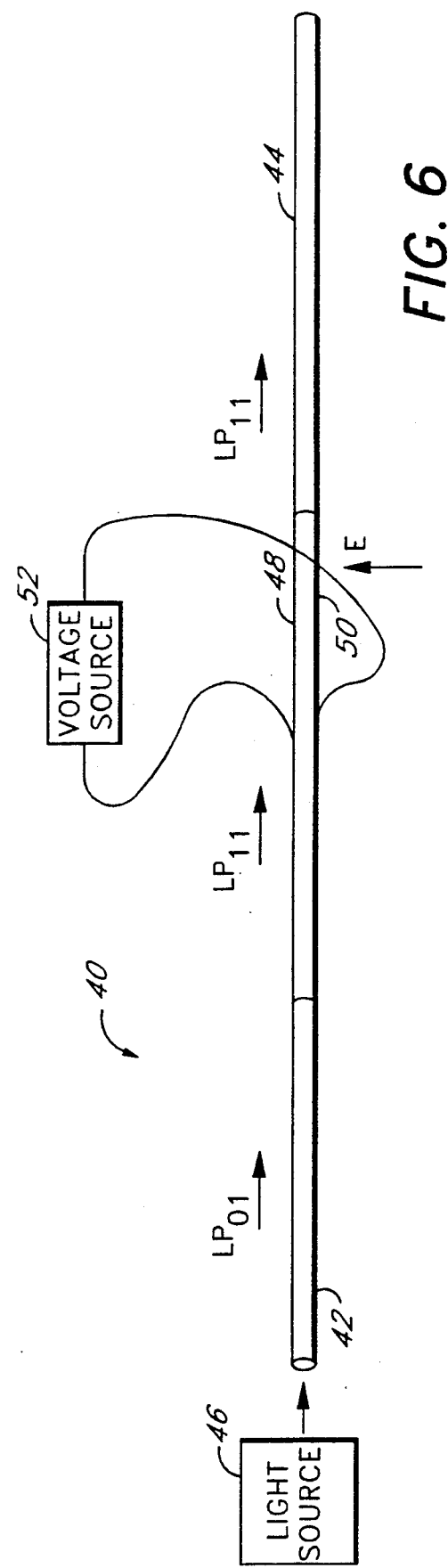
FIG. 6 represents a first embodiment of the present invention and illustrates a mode converter in accordance with the present invention.

The invention will now be described by reference to the figures wherein like parts are designated with like numerals throughout. A first embodiment of the present invention is represented in FIG. 6, which illustrates a mode converter 40. A fiber 42, preferably a single-mode fiber, is connected to the mode converter 40 by splicing or butt-coupling, or any other similar techniques. The single mode fiber 42 is typically a silica fiber and preferably a polarization maintaining fiber (PM fiber). The single-mode fiber 42 is connected to the mode converter 40. The mode converter 40 of the present invention comprises a LiNbO$_3$ single crystal fiber, and, preferably, an a-axis LiNbO$_3$ fiber. The mode converter 40 is further connected to a fiber 44, preferably a multimode fiber. The multimode fiber 44 is preferably bimodal and also preferably polarization maintaining. It is typically a silica fiber, but a person skilled in the art will recognize that other types of fiber are also suitable. A light source 46 emits light, preferably coherent light, that is launched into the monomode fiber 42 in a manner well known in the art. The mode converter 40 further comprises electrodes 48 and 50, which are connected to a voltage source 52. Electrodes 48 and 50 are mounted on the fiber 40. A method of mounting these electrodes will be described in more detail hereinbelow. The voltage source 52 applies a voltage across the two electrodes 48 and 50, thus creating an electric field E. When the electrical field E is applied to the LiNbO$_3$ fiber 40, a change in the refractive index occurs through the electro-optic effect. A more detailed description of the electro-optic effect will be given hereinbelow. This change in the refractive index has one sign in the upper half of the fiber and the opposite sign in the lower half of the fiber, due to the sign reversal of the electro-optic coefficient across the domain wall separating the two domains. Thus, optical fields propagating through the upper and lower halves of the fiber experience phase shifts of opposite sign.

If the voltage applied by the electrical source is selected so as to provide a $\pi/2$ phase retardation in one half, thus a $\pi/2$ phase retardation in the other half, for a total relative phase shift of $\pi$ between the two halves, an optical signal propagating through the fiber 40 can switch from one mode to the other. For example, if the light signal propagating in the fiber 42 is in the fundamental mode LP$_{01}$, the phase shift induced by the electrical voltage converts the light signal to a different propagation mode, e.g. into a second order propagation mode LP$_{11}$. The mode LP$_{11}$ exhibits two intensity lobes, and its nodal plane will coincide with the domain boundary. Conversely, if the signal is initially propagating in the second order mode LP$_{11}$, the phase shift $\pi/2$ added in one domain and subtracted in the other domain so as to yield a $\pi$ phase difference between the lobes in the two domains, converts the signal to the fundamental mode LP$_{01}$.

The operating principles of the present invention are best understood in connection with mode theory in optical waveguides. A brief summary of the applicable mode theory will now be presented to provide a more complete understanding of the invention. Although described below in connection with a LiNbO$_3$ optical fiber waveguide and a silica glass fiber, one skilled in the art will understand that the concepts presented are also applicable to other optical waveguides, such as integrated optics, or the like.

Mode Theory

Reference is first made to a regular silica fiber for a review of mode propagation in optical fibers. An exemplary cross section of a silica optical fiber 100 is illustrated in FIG. 7. The fiber 100 comprise an inner core 102 and an outer cladding 104. The inner core 102 has a radius of r. In the exemplary fiber 100, the core has a refractive index n$_{co}$ and the cladding has a refractive index n$_{cl}$. As is well known in the art, the core refractive index n$_{co}$ is greater than the cladding index n$_{cl}$ so that an optical signal propagating in the optical fiber 100 is well-guided. The number of modes guided by the optical fiber 100 depends upon the fiber geometry and upon the wavelength of the optical signal propagating therethrough. Typically, the wavelength above which an optical fiber will propagate only the fundamental or first-order mode is referred to as the "second-order mode cutoff" wavelength $\lambda_c$, which may be calculated for a circular core fiber utilizing the following equation:

$$\lambda_c = \frac{2\pi r \sqrt{n_{co}^2 - n_{cl}^2}}{2.405} \tag{1}$$

If the wavelength of the optical signal is greater than the wavelength $\lambda_c$ (i.e., the frequency of the optical signal is less than a cutoff frequency), only the first-order or fundamental propagation mode of the optical signal will be well-guided by the fiber and will be propagated by the fiber. If the wavelength of an optical signal is less than $\lambda_c$ (i.e., the frequency of the optical signal is greater than the cutoff frequency), higher order modes, such as the second-order modes, will begin to propagate.

The true first-order and second-order modes of a circular core optical fiber and their respective electric field amplitude distributions are illustrated in FIGS. 8a-8h. The two first-order modes are the vertically polarized $HE_{11}$ mode represented by an electric field pattern 110 in FIG. 8a, and the horizontally polarized $HE_{11}$ mode, represented by an electric field pattern 112 in FIG. 8b. The outer circle in each figure represents the boundary of the core 102 of the fiber 100 of FIG. 7.

As illustrated in FIG. 8c, the $HE_{11}$ modes have an electric field amplitude distribution 116 that is substantially symmetrical around the centerline of the core 102. The electric field amplitude distribution 116 is concentrated in the center of the core 102 and decreases as the distance from the center of the core 102 increases. A small portion of the electric field amplitude distribution 116 often extends beyond the boundaries of the core. This extended electric field is commonly referred to as the evanescent field of the guided modes.

The four true second-order modes are illustrated in FIGS. 8d-8g. These four true modes are distinguished by the orientation of the transverse electric field, denoted by the directions of the arrows in FIGS. 8d-8g, and are commonly referred to as the $TE_{01}$ mode, represented by an electric field pattern 120 in FIG. 8d; the $TM_{01}$ mode, represented by an electric field pattern 122 in FIG. 8e; the $HE_{21}$ even mode, represented by an electric field pattern 124 in FIG. 8f; and the $HE_{21}$ odd mode, represented by an electric field pattern 126 in FIG. 8g.

An electric field amplitude distribution 130 for an exemplary optical signal propagating in the second-order modes is illustrated in FIG. 8h. As illustrated, the electric field amplitude distribution 130 is substantially equal to zero at the centerline of the core, and has two maximum amplitudes 132 and 134 near the boundary of the core. As further illustrated, the two amplitude maxima 132 and 134 have opposite signs. Further, a greater portion of the electric field distribution extends beyond the boundary of the core in the second-order modes, thus providing a larger evanescent field than for the $HE_{11}$ modes.

Each of the four true second-order modes has a slightly different propagation velocity from the other of the four second-order modes. Thus, when one or more of the true second-order modes are co-propagating in a two-mode fiber, the intensity distribution of the second-order mode varies as a function of the length of the fiber as a result of changes in the phase differences between the four modes as they propagate. The cross-sectional intensity distribution of the second-order mode changes in response to environmental changes that induce differential phase shifts between the almost degenerate four modes.

In order to more easily analyze the characteristics of optical signals propagating in the second-order propagation modes, the characteristics of the modes are analyzed using the LP approximations for the modes defined and described in detail in D. Gloge, "Weakly Guiding Fibers," *Applied Optics*, Vol. 10, No. 10, October 1971, pp. 2252-2258. In a polarization maintaining fiber (PM fiber), the degeneracy between the two first modes and the four second order modes is broken in such a way that the LP modes become the true modes of the PM fiber.

A better understanding of the mode theory of optical propagation in an optical fiber or similar waveguides can be obtained by referring to FIGS. 9a-9f, and wherein the first and second modes are represented in accordance with the LP approximations described by Gloge in his paper. The outer circles in each of the illustrations again represent the cross section of the core 102 of the optical fiber 100 of FIG. 7. The outlines within the core circles represent the electric field distributions. Arrows with the inner outlines represent the direction of polarization.

FIGS. 9a-9b show the field patterns of the two polarization modes in the fundamental $LP_{01}$ set of modes. A field pattern 140 in FIG. 9a represents vertically polarized light in the $LP_{01}$ fundamental mode, and a field pattern 142 in FIG. 9b represents horizontally polarized light in the fundamental $LP_{01}$ mode.

FIGS. 9c-9f illustrate the $LP_{11}$ approximations for the second-order modes. As illustrated in FIGS. 9c-9f, there are four $LP_{11}$ modes, each having two lobes for the electric field distribution. Two of the modes, represented by an $LP_{11}$ mode pattern 150 in FIG. 9c and an $LP_{11}$ mode pattern 152 in FIG. 9d, are referred to herein as the $LP_{11}$ even modes. The other two $LP_{11}$ modes, represented by an $LP_{11}$ mode pattern 154 in FIG. 9e and an $LP_{11}$ mode pattern 156 in FIG. 9f, are referred to as the $LP_{11}$ odd modes. The four $LP_{11}$ modes are distinguished by the orientation of the lobe patterns and the orientation of the electric field vectors (i.e., the polarization vectors) within the lobe patterns. For example, the first $LP_{11}$ even mode field pattern 150 (FIG. 9c) has two lobes that are symmetrically located about a horizontal zero electric field line 160. Within the two lobes, the electric field vectors are parallel to and anti-symmetric about the zero electric field line 160. For convenience, the $LP_{11}$ mode represented by the lobe pattern 150 will be referred to as the horizontally polarized $LP_{11}$ even mode.

The second $LP_{11}$ even lobe pattern 152 (FIG. 9d) is symmetrically located about a horizontal zero electric field line 142. Within the two lobes of the field pattern 152, the electric field vectors are perpendicular to and anti-symmetric about the zero electric field line 162. The $LP_{11}$ mode represented by the electric field pattern 152 will be referred to as the vertically polarized $LP_{11}$ even mode.

The first $LP_{11}$ odd mode field pattern 154 has two lobes that are symmetrically located about a vertically oriented zero electric field line 164. Within the two lobes, the electric field vector is perpendicular to and anti-symmetric about the zero electric field line 164, and are thus oriented horizontally. The $LP_{11}$ mode represented by the field pattern 154 will thus be referred to as the horizontally polarized $LP_{11}$ odd mode.

The electric field pattern 156 of the second $LP_{11}$ odd mode has two lobes that are symmetrically located about a vertically oriented zero electric field line 166. Within the two lobes, the electric field vectors are parallel to and anti-symmetric about the zero electric field line 166.

Thus, the $LP_{11}$ mode represented by the electric field pattern 156 will be referred to as the vertically polarized $LP_{11}$ odd mode.

In the LP-mode approximations, each of the six electric field patterns in FIGS. 9a-9f, namely the two $LP_{01}$ patterns and the four $LP_{11}$ patterns, are orthogonal to each other. In other words, in the absence of perturbations to the optical waveguide, there is substantially no coupling of optical energy from one of the field patterns to any of the other field patterns. Thus, the six electric field patterns may be viewed as independent optical paths through the optical waveguide, which ordinarily do not couple with each other. As stated previously, in a polarizing maintaining fiber, the LP modes are the true modes of the fiber. Thus, each of the modes represented in FIGS. 9a-9f has a well defined propagation velocity.

If the indices of the core 102 and the cladding 104 of the optical fiber 100 are approximately equal, the two $LP_{01}$ modes will travel through the fiber at approximately the same propagation velocity, and the four second-order $LP_{11}$ modes will travel through the fiber at approximately the same propagation velocity. However, the propagation velocity for the fundamental $LP_{01}$ set of modes will be slower than the propagation velocity for the second-order $LP_{11}$ set of modes. Thus, the two sets of modes, $LP_{01}$ and $LP_{11}$, will move in and out of phase with each other as the light propagates through the fiber. The propagation distance required for the two sets of modes to move out of phase by 360° (i.e., $2\pi$ radians) is commonly referred to as the beat length of the fiber, which may be mathematically expressed as:

$$L_B = \frac{\lambda}{\Delta n} = \frac{2\pi}{\Delta \beta} \quad (2)$$

where $L_B$ is the beat length, $\lambda$ is the optical wavelength in a vacuum, $\Delta n$ is the difference in the effective refractive indices of the two sets of modes, and $\Delta \beta$ is the difference in the propagation constants for the two sets of modes. In polarization maintaining fibers (PM's), modes with different polarizations have different propagation velocities. Therefore, in a two-mode PM fiber, there may be more than one beat length.

It has been previously shown that coherent power transfer between the two sets of the modes, $LP_{01}$ and $LP_{11}$, can be achieved by producing periodic perturbations in the optical fiber that match the beat length of the two modes. A number of optical devices have been constructed to control the coupling of optical energy between the two modes to provide useful devices for selective coupling, filtering and frequency shifting of an optical signal. See, for example, W. V. Sorin, et al., "Highly selective evanescent modal filter for two-mode optical fibers," *OPTICS LETTERS*, Vol. 11, No. 9, September 1986, pp. 581-583; R. C. Youngquist, et al., "All-fibre components using periodic coupling," *IEEE Proceedings*, Vol. 132, Pt. J, No. 5, October 1985, pp. 277-286; R. C. Youngquist, et al., "Two-mode fiber modal coupler," *OPTICS LETTERS*, Vol. 9, No. 5, May 1984, pp. 177-179; J. N. Blake, et al., "Fiber-optic modal coupler using periodic microbending," *OPTICS LETTERS*, Vol. 11, No. 3, March 1986, pp. 177-179; B. Y. Kim, et al., "All-fiber acousto-optic frequency shifter," *OPTICS LETTERS*, Vol. 11, No. 6, June 1986, pp. 389-391; and J. N. Blake, et al., "All-fiber acousto-optic frequency shifter using two-mode fiber," *Proceedings of the SPIE*, Vol. 719, 1986. The present invention provides substantial improvement to many of those devices and provides a number of new devices that utilize coupling between the modes to further control an optical signal.

Mode Conversion

Figure 10A:
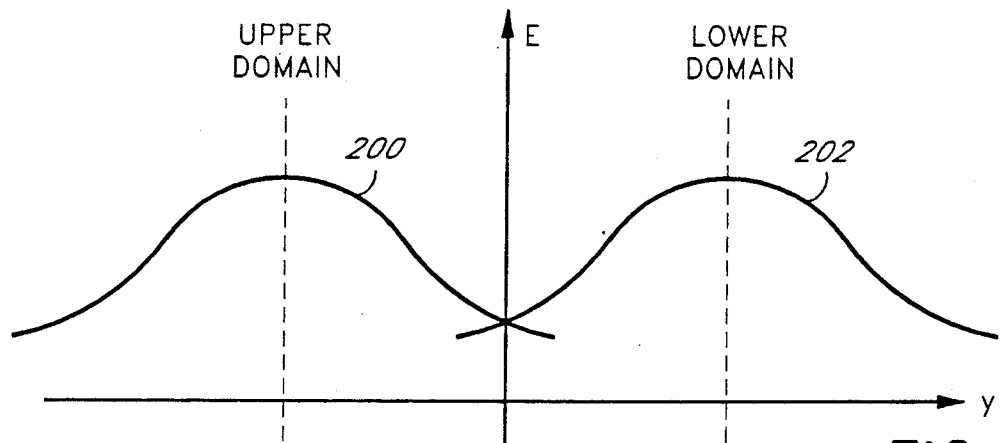
FIGS. 10a-10c schematically illustrate how the lightwave propagating in the fundamental mode launched into one end of the mode converter of FIG. 6 is converted into a second order mode.
Figure 10B:
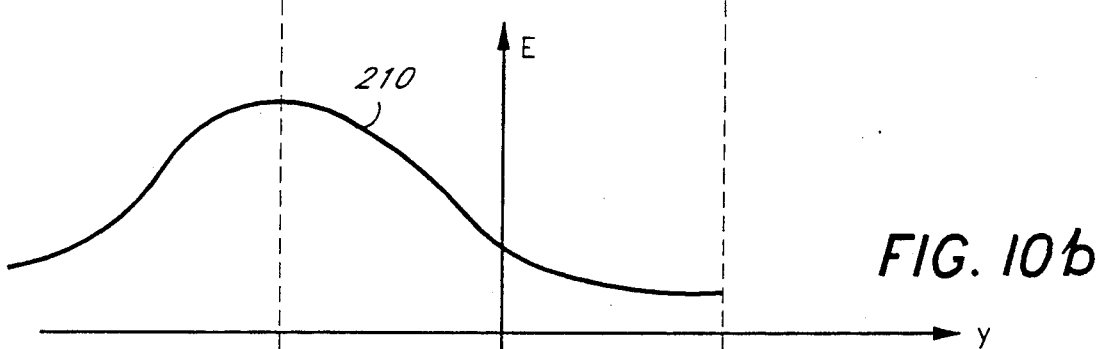
Figure 10C:
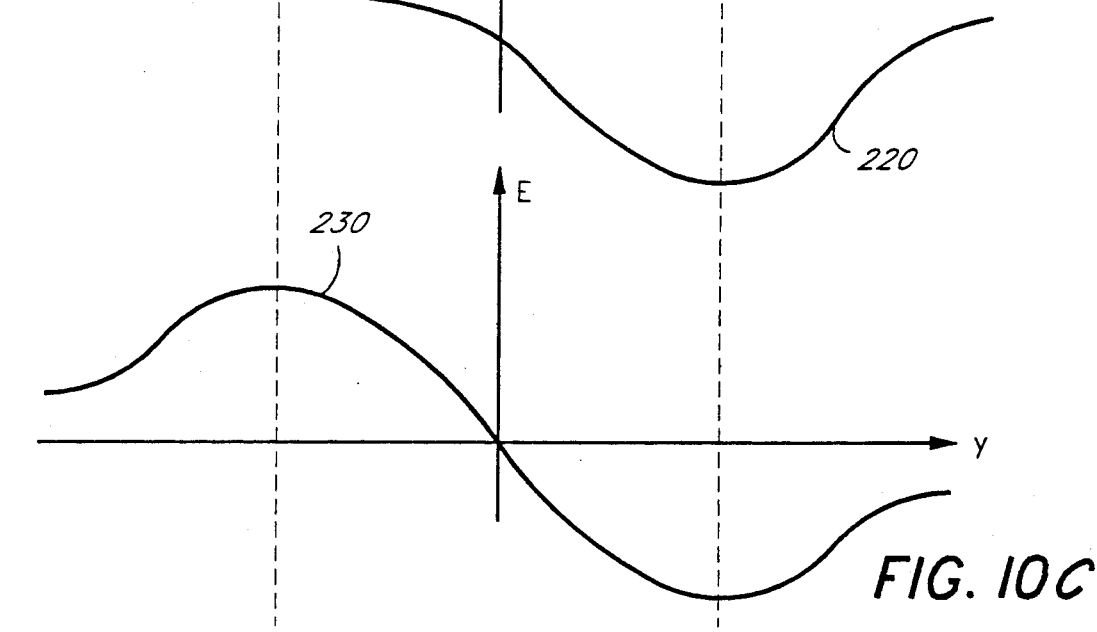

Reference is now made to FIGS. 10a-10c, which illustrate how the lightwave propagating in the fundamental mode launched into one end of the mode converter 40 of FIG. 6 is converted into the second order mode upon applying a voltage V across the electrodes 48 and 50 of FIG. 6.

Light conducted by the optical fiber 42, in the fundamental mode, preferably the vertically polarized $LP_{01}$ mode (see FIG. 9a), is first introduced into one end of the mode converter 40. The fundamental mode of the optical fiber 42 is matched to the fundamental mode of the mode converter 40. This mode is illustrated in FIG. 10a, wherein the field distribution of the fundamental mode in the mode converter 40 is represented by the curve 200 in the upper domain and by the curve 202 in the lower domain. As explained above, the field distribution is maximum at the center of each domain of the fiber FIG. 11a graphically illustrates the light distribution in the fiber 22. The maximum intensity of the light is at the center of the fiber. It will be recognized by the person skilled in the art that the representation of the intensity of the fundamental mode in each of the domains of the fiber shown in FIG. 10a is actually a simplified illustration of a more complex phenomenon that can only be precisely described by resolving the light propagation equations in a fiber having a bi-domain structure.

Upon applying a voltage between the two electrodes 48 and 50, illustrated in FIG. 6, a phase difference is introduced in the field distribution. This is due to the change in the refractive index occurring through the electro-optic effect. The change has one sign in the upper half of the fiber, represented as the upper domain section on the left-hand sign of FIG. 10b, and the opposite side in the lower half of the fiber, represented as the lower domain section on the right-hand side of FIG. 10b. This is due to the sign reversal of the electro-optic coefficient across the domain wall, i.e., the centerline of the optical fiber. The voltage is selected to induce a $\pi/2$ phase retardation in one half of the fiber, for example the upper domain, and to induce a $-\pi/2$ phase retardation in the second half, the lower domain. The field distribution illustrated by the curve 200, is thus changed into a different field distribution. This is illustrated in FIG. 10b by the curves 210 and 220. In order to illustrate the change of signs between the curves 200 and 202 of FIG. 10a, the curve 200 remains at the same location and is now designated by the numeral 210. However, the curve 202 is inverted with respect to the y-axis and changes sign. It is now designated by the numeral 220. This results in a optical phase shift between the two domains. A person skilled in the art will recognize that phase retardations equal to an odd multiple of $+\pi/2$ would also be suitable.

The resulting field distribution in the fiber is now the sum of the curve 210 and curve 220 of FIG. 10b. This is represented by the curve 230 in FIG. 10c, which now shows the final field distribution of the electrical field when a voltage is applied between the electrodes mounted on the fiber. A person skilled in the art will recognize that the field distribution obtained in FIG. 10c is indicative of a second order mode. Thus, by applying a voltage across the fiber, and selecting this voltage so as to induce a $+\pi/2$ retardation in one domain, and a $-\pi/2$ retardation in the other domain, a fundamental mode can be converted into a second order mode. Reciprocity applies in the optical converter of the present invention. This means that a second order mode can be converted into a first order mode, or fundamental mode, by applying the same steps described above but in the reverse order. FIG. 11b is a graphic The electric filed E is selected to cause a $\pi/2$ phase shift in the upper domain 24 and a $-\pi/2$ phase shift in the lower domain 26. The light in the fundamental mode as shown in FIG. 11a is now propagating in the second order mode. The two lobes 252 and 256 correspond to the light distribution of second order mode. The intensity is maximum in the central portion of each domain.

Calculations based on coupled mode theory also corroborate the results produced above, and illustrated in FIGS. 10a–10c and 11a–11b.

The voltage must therefore be selected so as to induce a proper phase retardation in the two halves of the lithium niobate fiber. The largest electro-optic coefficient of LiNbO$_3$, designated by r$_{33}$ is preferable for electro-optic applications. A more detailed review of the electro-optic properties of lithium niobate is provided below. In order to select that coefficient, it is sufficient to orient both the external electric field and the optical field polarization along the c-axis of the fiber as shown in FIG. 5. As a consequence, the required voltage is a minimum. In this case the $\pi/2$ retardation voltage is given by:

$$V = \frac{\lambda}{2n_e^3 r_{33}} \frac{d}{L} \quad (3)$$

where $\lambda$ is the wavelength of the optical lightwave propagating in the fiber, $n_e$ is the extraordinary refractive index of the fiber (in the order of 2.2), r$_{33}$ is the electro-optic coefficient of LiNbO$_3$, in the order of $30 \times 10^{-10}$ cm/volt, d is the electrode separation (typically the fiber width) and L is the interaction length (typically the electrode length). In a preferred embodiment of the present invention, the electrode separation d is selected to be 60 $\mu$m, the wavelength $\lambda$ is 0.63 $\mu$m and the electrode length L is 1 cm. For such data and dimensions, the resulting voltage is in the order of 6 volts.

Optical Switch/Modulator Using the Electro-Optic Effect

If the voltage that induces phase retardations is selected so that the phase shifts are not odd multiples of $\pi/2$, the mode conversion is only partial. The output lightwave is a linear combination of the two modes. For instance, if an optical lightwave is input into one end of a LiNbO$_3$ fiber in the fundamental mode, the output lightwave can be a combination of the first and second order modes, depending upon the value of the voltage applied between the electrodes. The optical switch of the present invention is based on this partial mode conversion.

Figure 12:
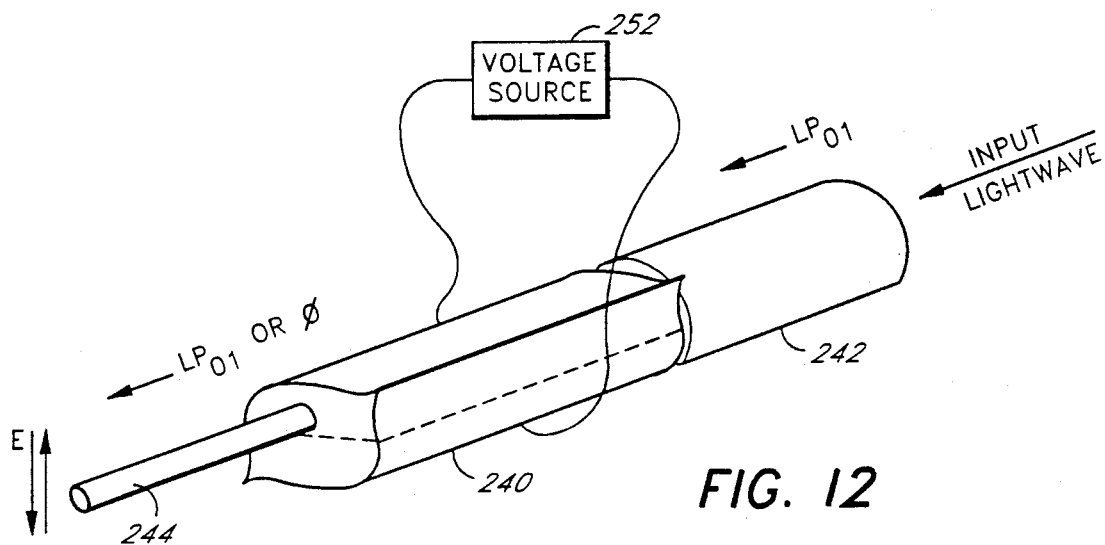
FIG. 12 represents an optical switch according to the present invention.

Reference is now made to FIG. 12, which represents an optical switch according to the present invention. The optical switch comprises a LiNbO$_3$ single crystal optical fiber 240, connected to an input optical fiber 242, preferably a silica fiber. The silica fiber 242 can be a bi-mode fiber, or a multi-mode fiber. Preferably, the fiber 242 is a polarization maintaining fiber. A coherent light source (not represented) emits an input lightwave, which is launched into the silica fiber 242 in the fundamental mode. The optical switch of the present invention further comprises an optical fiber 244. The fiber 244 is preferably monomode. The size of the optical fiber 244 is selected so as to be coupled to only one of the domains of the single crystal fiber 240. The optical fiber 244, preferably a silica fiber, is butt-coupled or spliced to either the upper half or lower half of the LiNbO$_3$ fiber 240. In the embodiment represented in FIG. 12, the optical fiber 244 is coupled to the upper domain of the LiNbO$_3$ single crystal fiber 240. The size of the fundamental mode LP$_{01}$ of the fiber 244 preferably matches the size of one of the lobes of the second-order mode LP$_{11}$ even (see FIG. 9c and FIG. 9d) of the LiNbO$_3$ fiber 240. A voltage source 252 is connected to electrodes mounted on the fiber 240 in a similar manner as represented in FIG. 6. The voltage source 252 is preferably an AC voltage source. The frequency of the voltage source 252 commands the frequency of the optical switch 240.

The single-crystal fiber is operated at $\pm\pi/4$ phase retardations, in such a way as to switch the optical power either into or away from the fiber 240. The electrical field thus alternates between a positive value and a negative value, corresponding respectively to $+\pi/4$ and $-\pi/4$ phase retardations. Such retardations result in 50% mode conversion, and a modal field superposition whose energy is concentrated in one lobe. When the power is in the upper lobe, maximum coupling to the fiber 240 is obtained, whereas when the power is in the lower lobe, minimum (ideally zero) coupling occurs. The high speed of operation due to the electro-optic effect in a LiNbO$_3$ makes this optical switch particularly important for optical switching.

Figure 13A:
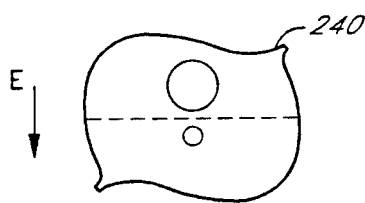
FIG. 13a represents a cross-section of the LiNbO$_3$ fiber of FIG. 12 subject to an electrical field E inducing a $+\pi/4$ phase shift in the upper domain of the fiber and a $-\pi/4$ phase shift in the lower domain of the fiber.
Figure 13B:
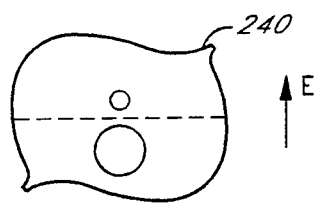

FIG. 13a represents a cross-section of the fiber 240 when the electrical field E induces a $+\pi/4$ phase shift in the upper domain of the fiber 240 and a $-\pi/4$ phase shift in the lower domain of the fiber 240. The reverse situation is illustrated in FIG. 13b with the electrical field having the reverse orientation to the electrical field of FIG. 13a. In FIG. 13a, the maximum intensity is in the upper domain. The optical device 240 allows light to be coupled to the fiber 244 (ON position). In FIG. 13b, the maximum intensity is in the lower domain. The optical switch 240 does not allow light to be coupled into the fiber 244. This corresponds to an OFF position.

Practically, some light is coupled in the case represented in FIG. 13b. The amount of light coupled is however minimal. The optical switch thus obtained has a very high speed of operation in the GHz range.

Optical Amplitude Modulator

For other phase retardations, the device of FIG. 12 can operate as an amplitude modulator. For example, phase retardations between $+\pi/4$ and $+\pi/2$ allow the device of FIG. 12 to operate as an amplitude modulator. The intensity of the light coupled into the fiber 244 can be any fraction of the light launched into the lithium niobate fiber 240.

Theoretical Background: Electro-Optic Effect or Pockels Effect

The mode converter of the present invention and the optical switch of the present invention are based on the electro-optical properties of LiNbO$_3$. A detailed description of this effect can be found in the literature and in particular in "Guided Wave Opto-Electronics", by Tamir, Springer-Verlag, 1988, as well as a thesis by Dr. Amado Cordova, "LiNbO$_3$ miniature lasers and single-crystal fibers," Stanford University, catalogued on Apr. 28, 1988. Both these references are hereby incorporated herein by reference. The following is a brief summary of the Pockels effect as described in the Tamir reference and the Cordova reference and will provide a more complete understanding of the present invention.

The linear electro-optic (Pockels) effect, which is the basis for active waveguide device control, provides a change in refractive index proportional to the applied electric field. The way in which this index change results in optical switching, intensity modulation, filter tuning, etc., depends upon the device configuration. A voltage V applied to the electrodes placed over or alongside a LiNbO$_3$ waveguide creates an internal electric field of approximate magnitude V/G, G being the width of the electrode gap.

Wave propagation in anisotropic crystals is conveniently described by means of the impermeability tensor b, which relates the three components of the dielectric displacement vector D, to the three components of the optical electric field vector E. The impermeability tensor for LiNbO$_3$ is given by:

$$D = b \cdot \epsilon$$

$$b = \begin{vmatrix} \frac{1}{n_o^2} - r_{22}E_y + r_{13}E_z & -r_{22}E_x & r_{42}E_x \\ -r_{22}E_x & \frac{1}{n_o^2} + r_{22}E_y + r_{13}E_z & r_{42}E_y \\ r_{42}E_x & r_{42}E_y & \frac{1}{n_e^2} + r_{33}E_z \end{vmatrix}$$

where $r_{ij}$ is the 6×3 electro-optic tensor.

It can be shown that for a given direction of wave propagation, there are two orthogonal polarizations for the D vector, called eigenpolarizations, exhibiting a well defined phase velocity and refractive index. If the light wave is not polarized along one of these privileged directions, it does not propagate through the crystal as a pure wave. Instead, it is split into two components polarized along the privileged directions. These two waves will travel at different phase velocities.

The approach to find the eigenpolarizations and their associated refractive indices, consists of diagonalizing the b tensor and then using the so-called index ellipsoid, or optical indicatrix to obtain the indices. For an uniaxial crystal, the principal values of the b tensor are $b_{11} = b_{22} = 1/n_o^2$ and $b_{33} = 1/n_e^2$, where $n_o$ and $n_e$ are the ordinary and the extraordinary refractive indices, respectively.

Upon application of an external electric field E, the b tensor is modified, and the eigenvalue problem must be solved again. Table 2 shows the b tensor for LiNbO$_3$, in the principal axes coordinate system, modified by the application of an E field. Table 2 can be found in annex A.

To reduce the voltage requirement of a LiNbO$_3$ modulator, it can be shown that it is preferable that the E field be perpendicular to the direction of propagation (transverse E field). Under these conditions, three possible configurations can be identified.

In a first preferred configuration, wave propagation takes place along the c (or z) axis and the E field is applied either along the x-axis or along the y-axis. When E is applied parallel to x, the eigenpolarizations rotate 45° with respect to the x-y axes. When E is applied along y, the eigenpolarizations remain parallel to the principal axes.

In a second preferred configuration, wave propagation occurs along either the x or the y axes, and E is applied parallel to c. In this case, the eigenpolarizations remain parallel to the principal axes, i.e., x and z for propagation along y, or y and z for propagation along x.

In a third preferred configuration, propagation takes place along x or y and E is perpendicular to c. Under these conditions, the polarizations are rotated with respect to the principal axes by an angle that is a function of the applied field. However, this angle is exceedingly small even for applied fields over $10^3$ V/mm.

Table 2 shows the eigenvalues of the tensor b for these three configurations. When passing through the crystal, the two eigenpolarizations experience different phase delays $\phi_1$ and $\phi_2$, given by $\phi_i = 2\pi/\lambda \, n_i L$, where i=1 or 2, L is the crystal length, $\lambda$ the wavelength and $n_i$ the refractive index associated with the $i_{th}$ eigenpolarization. The difference in phase delays $\phi_1 - \phi_2$ for the three configurations is listed in Table 2. In this computation, the applied E-field equals the ratio of applied voltage V to electrode separation d.

Table 2 reveals some important similarities and differences between the configurations. First, the change in birefringence induced by an applied voltage V is proportional to the quotient L/d (L/d$^2$ for the third configuration). Therefore, a given voltage will be more efficient, i.e., produce a larger change in birefringence, when the separation between electrodes is much smaller than the length of the crystal. In the case of a longitudinal amplitude modulator, the length of the crystal L is also the electrode separation d. For this reason, a transverse modulator is preferred. Second, the birefringence induced by an applied voltage in the first configuration is proportional to $r_{22}n_o^3$, which is smaller than $(n_e^3 r_{33} - n_o^3 r_{13})/2$ (second configuration). In addition, the factor $r_{42}^2$ (¢$10^{-22}$ m$^2$/V$^2$) is expected to significantly reduce the induced birefringence in the third configuration. Consequently, the second configuration is the preferred embodiment of the present invention.

As discussed above, the linear change in the coefficients of the index ellipsoid due to an applied electric field ($E_j$) along the principle crystal axis is given by the following equation:

$$\Delta \left( \frac{1}{n_i^2} \right) = \sum_{j=1}^{3} r_{ij}E_j \quad (4)$$

or $$(\Delta n)_i = -\frac{n^3}{2} \sum_{j=1}^{j=3} r_{ij}E_j \quad (5)$$

where i=1, 2, ..., 6 and $r_{ij}$ is the 6×3 electro-optic tensor. By inserting the electro-optic tensor $r_{ij}$, the six values of $\Delta n$ can be written as the elements of a symmetric 3×3 matrix. For lithium niobate:

$$\Delta n_{ij} = \frac{-n^3}{2} \begin{vmatrix} -r_{22}E_y + r_{13}E_z & -r_{22}E_x & r_{42}E_z \\ -r_{22}E_z & r_{22}E_y + r_{13}E_z & r_{42}E_y \\ r_{42}E_x & r_{42}E_y & r_{33}E_z \end{vmatrix} \quad (6)$$

where n is either the ordinary $n_o$ or extraordinary $n_e$ value.

The values of the electro-optic coefficients for lithium niobate are listed in Table 3.

TABLE 3

| Electro-Optic Coefficients (cm/V) | |
| --- | --- |
| $r_{33} = 30.8 \times 10^{-10}$ | $r_{42} = 28.0 \times 10^{-10}$ |

TABLE 3-continued

| Electro-Optic Coefficients (cm/V) | | |
|---|---|---|
| $r_{13} = 8.6 \times 10^{-10}$ | $r_{22} = 3.4 \times 10^{-10}$ | (high frequency) |
| | $r_{22} = 6.3 \times 10^{-10}$ | (low frequency) |

Utilization of the diagonal elements 11, 22 and 33 of the perturbed refractive index matrix results in an index and, therefore, phase change, for an incident optical field polarized along the crystallographic x, y and z axis, respectively. These diagonal elements effect an index change, essential for switches and modulators, for the optical field aligned (polarized) along the crystallographic j axis given an electric field applied in the appropriate direction. For example, an electric field directed along $E_z$ ($E_3$) causes index change (to the extraordinary index, j=3)

$$\Delta n_{33} = \frac{-n^3}{2} r_{33} E_z \qquad (7)$$

The electrode orientation relative to the waveguide needed to generate $E_z$ depends upon the orientation of the crystal used. The orientation is frequently specified by the "cut" the direction perpendicular to the flat surface on which the waveguide is fabricated.

The off diagonal elements of Equation (6) on the other hand, represent electro-optically induced conversion or mixing between orthogonal polarization components. For example, $$\Delta n_{13} = \frac{-n^3}{2} r_{42} E_x \qquad (8)$$

represent a rotation of the index ellipsoid that causes a coupling proportional to the $r_{42}$ coefficient between the otherwise orthogonal $A_1$ and $A_3$ optical fields due to an electric field applied in the x direction ($E_x$). Utilization of off-diagonal electro-optic elements is preferable to induce polarization change in LiNbO$_3$ waveguides (in the prior art, Ti:LiNbO$_3$ waveguides).

As mentioned above, in LiNbO$_3$ waveguides, the crystal orientation is typically chosen to use the largest electro-optic coefficient, $r_{33}$ (in the order of $30.9 \times 10^{-10}$ cm/V).

The local electro-optically induced index change is given by equation (7). As neither the applied electric field nor the optical field is uniform, it is convenient to model the effective applied field inside the waveguide by that of a simple parallel plate capacitor as in the case of a bulk modulator where the lithium niobate crystal is sandwiched between two electrodes and both optical and electrical fields are assumed to be uniform. The correction factor from this simple model is given by an overall parameter $\Gamma$. The effective electro-optically induced index change within a cross-section of the optical mode can be written as $$\Delta n(V) = \frac{-n^3 r}{2} \frac{V}{G} \Gamma \qquad (9)$$

where G is the interelectrode gap and $\Gamma$ is the overlap integral between the applied electric field and the optical mode. The quantity $\Gamma 0$ is given by $$\Gamma = \frac{G}{V} \int_{-\infty}^{\infty} \int E|A|^2 dA \qquad (10)$$

where A is the normalized optical field distribution and E is the applied electric field. The total phase shift over the interaction length L is then $$\Delta \beta L = -\pi n^3 r \Gamma \frac{V}{G} \frac{L}{\lambda} \qquad (11)$$

The exact phase shift required to achieve complete intensity modulation or switching depends upon the modulator or switch type. In order to introduce a $\pi/2$ shift (or a multiple of $\pi/2$), the modulation condition must verify the following equation:

$$|\Delta \beta L| = p\pi/2$$

where p, which depends upon the modulator type, is on the order of one. The voltage length product required for modulation is thus, $$VL = \frac{p\lambda G}{2n^3 r \Gamma} \qquad (12)$$

The potential bandwidth of waveguide modulators is in practice always limited by distributed circuit effects. The electro-optic effect is an electronic phenomenon that has a subpicosecond response time. Practically, the overlap integral $\Gamma$ is approximately L, the interaction length (electrode length).

Electrode Fabrication

In order to properly fabricate the devices of the present invention, it is essential to be able to mount the electrodes on the single crystal fiber. The fabrication of electrodes on a single crystal fiber is complicated by the small diameter and the geometry of the fibers. Electrode deposition is the preferred method in accordance with the present invention. A deposition technique comparable to the deposition technique used in standard planar technology can be performed. It also possible to use zinc-oxide technology.

The first preferred method is referred to as EEEM (Evaporation followed by Etching of Excess Metal). The second preferred method is referred to as ESM (Evaporation using a Silicon Mask). The EEEM method, in spite of its simplicity, yields very good results when applying it to lithium niobate single-crystal fibers.

The EEEM method allows the first successful fabrication of electrodes of the transverse type on a single crystal fiber. This method consists in first mounting the fiber on a metallic holder and placing it inside an evaporation chamber of gold or other suitable electrode material. Before the gold deposition, the fiber is preferably oriented in the holder, to avoid accumulation of gold on undesired regions of the fiber surface. One situation that it is preferable to avoid is the formation of three electrodes instead of two, which results, in the case of c-axis fibers, from the symmetric deposition of metal around each one of the three longitudinal ridges.

A metallic holder is preferably used to support the fiber during gold evaporation. It typically consists of two pieces of aluminum, one of which contains V- grooves where one or two fibers can sit. The tip of the fiber is first inserted into a capillary tube and cemented with alumina bond. The capillary is then placed on one of the holder V-grooves, with the fiber protruding from the aluminum holder. The capillary is rotated by hand under microscope observation of the fiber surface, until one of the longitudinal ridges is centered on the microscope image. This orientation procedure yields, after etching, one electrode centered about the top ridge, and the other electrode filling the region between the two bottom ridges. Finally, the capillary tube is firmly secured by screwing the second aluminum piece on top of the first piece.

After the fiber has been placed in the fiber holder, the fiber and fiber holder are placed inside a vacuum evaporation chamber where an electron beam heats a metallic target. After a first deposition, the holder is rotated by 180°, and, without moving the fiber, a second deposition follows. Typically, the thicknesses of the deposited layers are approximately 100 Å of chrome and 0.6 $\mu$m of gold (for thin fibers) or 2.0 $\mu$m of gold (for thick fibers). The chrome layer serves to enhance the adhesion of gold.

Due to the finite divergence of the evaporating beam, some metal is also deposited on the portions of fiber located between the electrodes. However, these inter-electrode layers are thinner than the electrodes themselves and could be removed by using chemical etchants, as described below.

The gold etchant preferably consists of a solution of potassium iodide and iodine in water (100 gr KI, 100 gr $I_2$ and 200 ml $H_2O$). The chromium etchant is preferably composed of cerium sulfate, nitric acid and water (27 gr $H_4Ce(SO_4)_4$, 100 ml $HNO_3$, 400 ml $H_2O$).

The EEEM method depends upon a complete removal of the inter-electrode or "excess metal," while simultaneously avoiding an excessive etching of the electrodes themselves. The metal-removal time is a critical parameter for the accomplishment of this objective.

The gold etchant can also be diluted in water by a ratio 1/20. In the EEEM method, the etching time for one fiber is preferably 25 seconds in the diluted gold etchant, follows by 20 seconds in the chrome etchant. Another fiber is immersed in the gold etchant more than once, to remove a thin metallic strip at the center of one of the inter-electrode zones. For this second fiber, the total gold etching time is 40 seconds. After each etching, the fiber is immersed in deionized water to remove the excess etchant. This immersion time in the chrome etchant is not critical, since the chrome underneath the gold electrodes is protected by the gold itself. Several $MgO:LiNbO_3$ fibers can be successfully electroded by using the EEEM technique.

A second preferred method consist of fabricating a mask containing a slot or V-groove with the desired electrode dimensions. This method is referred to as Evaporation using a Silicon mask (ESM). The dimensions of the mask are preferably about 1 cm in length and 50–100 $\mu$m in width. Very precise control of V-groove dimensions can be achieved in silicon wafers by using preferential etching. Chemical agents such as KOH can etch (100) crystallographic planes, 400 times faster than (111) planes. KOH-etching of a silicon wafer with <100> surface orientation results in the formation of V-grooves where the sides of the V are (111) planes. The angle between the V-side and the surface is 54.74°. In the preferred embodiment of the present invention, wherein the silicon wafer is used as a crystal-fiber mask, the silicon wafer preferably has V-grooves that pass through the wafer. During electrode deposition, the smaller base of the trapezoidal V-groove is placed in contact with the fiber surface, whereas the larger base of the trapezoid is exposed to the gold atoms. If two masking-wafers are made, the fiber can be clamped between the two wafers. This method offers a very precise control of the electrode dimensions.

As previously indicated in connection with the EEEM method, some initial problems are solved by allowing rotation-orientation of the fiber in its holder before evaporation, and by diluting the gold etchant. Various types of fibers can be used, for example, 170 $\mu$m-diameter, c-axis $Nd:MgO:LiNbO_3$ fibers or 90 $\mu$m-diameter, c-axis and a-axis $MgO:LiNbO_3$ fibers.

The inter-electrode zones for 170 $\mu$m-diameter, c-axis $Nd:MgO:LiNbO_3$ fibers typically have widths of 30 $\mu$m and 50 $\mu$m respectively. For 90 $\mu$m-diameter, c-axis and a-axis $MgO:LiNbO_3$ fibers, the inter-electrode spacings are approximately 35 and 60 $\mu$m, respectively.

In fibers manufactured in accordance to the present invention, the first electrode is typically located symmetrically about one of the fiber ridges. The second electrode lies between the other two ridges, almost filling the space between them. The electrode location is a consequence of the orientation procedure described above. This method of mounting of electrodes has been successfully carried out with c-axis $LiNbO_3$ fibers and should also be successful with a-axis $LiNbO_3$ fibers preferably used in the present invention.

The fibers are preferably mounted in a fixture that allows fiber end-face polishing as well as easy access to the electrodes. In the preferred embodiment of the present invention, capillary tubes with slots are prepared on the side surface. Two slots, approximately 1 mm wide, are cut on each capillary tube with the aid of a diamond saw. The slots are diametrically opposite to each other and located at different positions along the tube. They are just deep enough to reach the inner hold of the capillary tube.

The preferred mounting procedure is the following. The electroded fiber is inserted into the capillary tube and oriented such as to expose each electrode to each of the slots. The bonding material selected is preferably wax, since epoxy would introduce undesired stress due to shrinking during the curing process. The capillary tube and the fiber are heated on a hot plate, up to the melting point of the wax. At that moment, wax is allowed to flow into the tube by capillary action. To prevent the wax from reaching the slots, thus covering the exposed portions of the electrodes, the capillary tube is rapidly cooled by removing it from the hot plate. The following step involves end-face fiber polishing.

The final step is wire-bonding. A small diameter wire is introduced into the slot and gently placed on top of the exposed electrode. Electrical contact between the electrode and the wire is made by melting a very small piece of indium-metal on top of them with the aid of a blow dryer. The cohesion of molten indium prevents it from migrating around the fiber, so that there is not a risk of short-circuiting the electrodes.

$LiNbO_3$ fibers electroded and mounted by using the procedures previously described, exhibit good electrical contact between the wires and the gold layers. These fibers are tested as electro-optic modulators. However, since these are unclad fibers, light propagation through them is highly multimoded. Different modes experience different phase shifts when passing through the fiber, and the resulting modal superposition at the fiber output exhibits a very low modulation depth. By combining the electrode fabrication and fiber mounting procedures with the cladding techniques previously described, LiNbO$_3$ single-crystal fiber modulators can be realized.

Mode/Frequency Converter Using the Second Harmonic Generation

Figure 14:
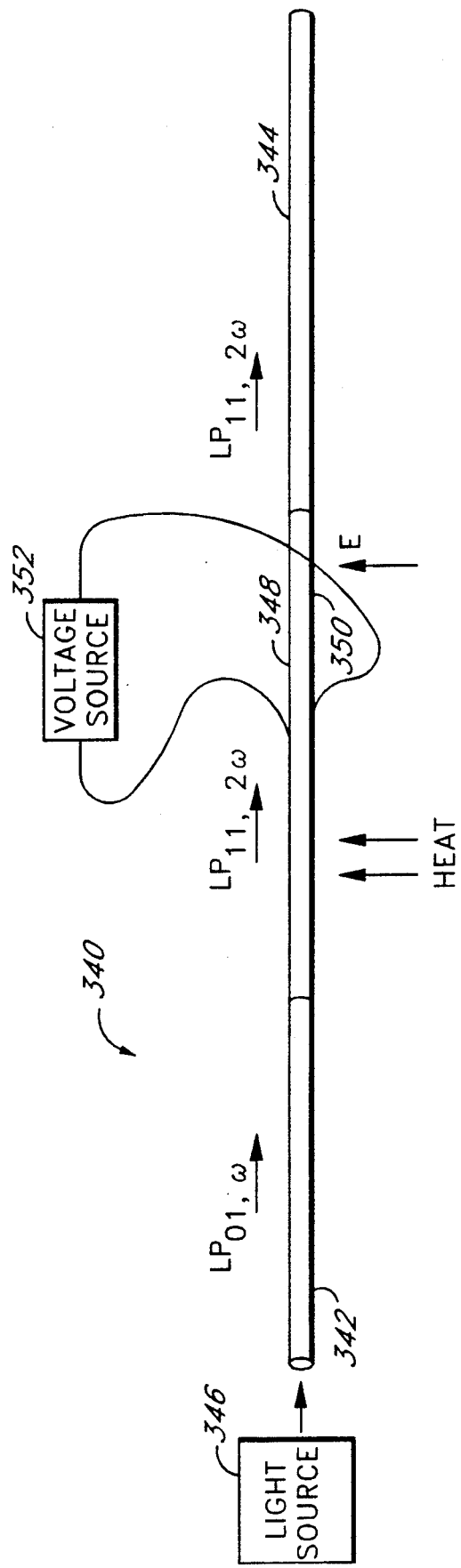
FIG. 14 illustrates another preferred embodiment of a mode converter of the present invention, based upon the second harmonic generation, is illustrated in FIG. 14.

The mode-converter described hereinabove can also be used as a second harmonic generator. This use of the LiNbO$_3$ single crystal fiber is based upon the second harmonic generation. A more detailed description of second harmonic generation in certain materials will be given hereinbelow. A preferred embodiment of the present invention, based upon the second harmonic generation, is illustrated in FIG. 14. This embodiment is similar in configuration to the embodiment represented in FIG. 6, used as a mode converter. Thus, the elements designated in FIG. 6 by the numerals 40–50 have been replaced in FIG. 14 by the numerals 340–350, respectively. In this embodiment, however, the fiber 340 is preliminarily heated to a phase matching temperature. The light source 346 emits a laser light signal which is launched into a monomode fiber 342. This signal propagates in the fundamental mode in the optical fiber 342, at a frequency f, corresponding to an angular frequency $\omega$. As the light signal propagates through the single crystal fiber 340, an electrical field is applied by means of the voltage source 352, between the electrodes 348 and 350 mounted on the single crystal fiber. This electrical field converts the propagation mode of the light signal in the fiber 340 from the fundamental mode LP$_{01}$ to the second order mode LP$_{11}$. Furthermore, second harmonic generation causes the frequency to be doubled. Thus, the second order mode light signal LP$_{11}$ propagates at a frequency 2f. A bi-mode fiber 344 is connected to the single crystal fiber 340 and thus propagates an optical signal at a frequency 2$\omega$ in the second order mode. As in the embodiment of FIG. 6, the single crystal fiber is preferably an a-axis grown fiber.

Thus, when the fiber is heated to the phase-matching temperature and an electrical field is applied at the fiber so as to cause $\pi/2$ phase retardations in different directions in both domains of the fiber 344, a second-harmonic signal is generated in the two-lobe, second order mode. This is due to the sign reversal of the second order susceptibility across the domain wall. The device 340 is at the same time a mode- and a frequency-converter. The electrical source may be omitted as the phase-matching conditions can be attained by heating the converter at an appropriate temperature.

Figure 15:
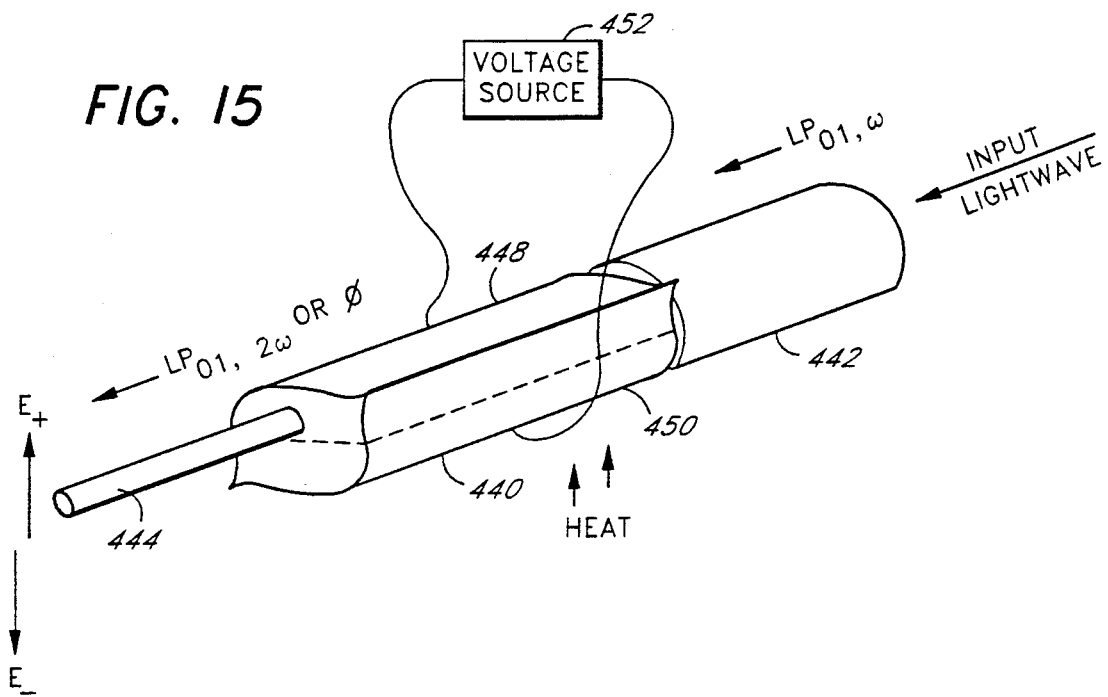
FIGS. 15 16a and 16b illustrates another preferred embodiment of an optical switch of the present invention, based upon the second harmonic generation.
Figure 16A:
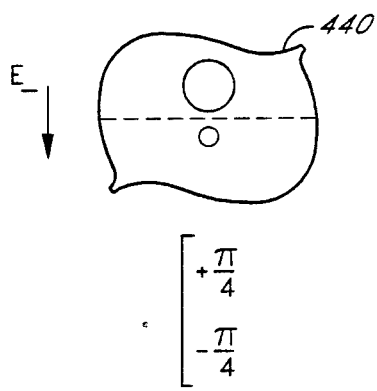
Figure 16B:
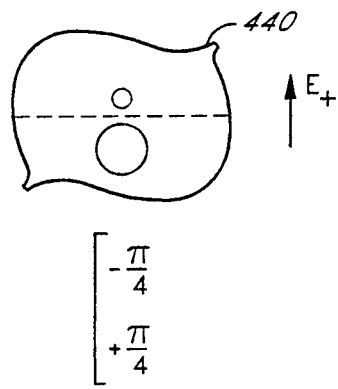

Optical Switch/Modulator/Frequency Converter Using the Second Harmonic Generation The optical switch described hereinabove in connection with the electro-optic effect can also be used as a second harmonic generator/switch. This use of the LiNbO$_3$ single crystal fiber is again based upon the second harmonic generation. A preferred embodiment of the present invention, based upon the second harmonic generation, is illustrated in FIG. 15. This embodiment is similar in configuration to the embodiment represented in FIG. 12, used as an optical switch. Thus, the elements designated in FIG. 12 by the numerals 240–252 have been replaced in FIG. 15 by the numerals 440–452, respectively. In this embodiment, however, the fiber 440 is preliminarily heated to a phase matching temperature. A light source (not represented) emits a laser light signal which is launched into a fiber 442. This signal propagates in the fundamental mode in the optical fiber 442, at a frequency f, corresponding to an angular frequency $\omega$. As the light signal propagates through the single crystal fiber 440, an electrical field is applied by means of the voltage source 452, between the electrodes 448 and 450 mounted on the single crystal fiber. This electrical field intensity to partially convert the propagation mode of the light signal in the fiber 340 from the fundamental mode LP$_{01}$ to the second order mode LP$_{11}$. If the partial conversion amounts to a 50% distribution between the fundamental mode and the second order mode, the phase retardations induced by the electrical field successively have the values $+\pi/4$ and $-\pi/4$. This is illustrated in FIGS. 16a and 16b, which are similar to FIGS. 13a and 13b and represent the light intensity distribution in the fiber 440 for two states of the electrical field. Additionally, because the phase-matching conditions are met by the heating the fiber 440 to a phase-matching temperature, second harmonic generation (SHG) can occur. SHG causes the frequency to be doubled. Thus, the fundamental and second order mode light signal also propagates at a frequency 2f. A fiber 444, preferably monomode is coupled or butt-spliced to a single domain of the crystal fiber 340, e.g. the upper domain in FIG. 15, FIGS. 16a and 16b. When the light distribution is maximum in the upper domain, as shown in FIG. 16a, the fiber 444 receives a signal in the fundamental mode at a frequency 2$\omega$. As in the embodiment of FIG. 12, the single crystal fiber is preferably an a-axis grown fiber.

Thus, when the fiber is heated to the phase-matching temperature and an electrical field is applied at the fiber so as to cause $\pi/4$ phase retardations in different directions in both domains of the fiber 344, a second-harmonic signal is generated in the two-lobe, in the fundamental mode and in the second order mode. This is due to the sign reversal of the second order susceptibility across the domain wall. The device 340 is at the same time a switch and a frequency-converter.

As for the mode converter using second harmonic generation, the electrical source may be omitted as the phase-matching conditions can be attained by heating the converter at an appropriate temperature.

Other Embodiments

The same inventive idea regarding the optical switch can be generalized to other types of nonlinear interactions, such as sum or difference frequency generation or parametric oscillation. In the case of sum or difference frequency generation, if the two waves at the input frequencies propagate in the fundamental fiber mode, the wave at the third frequency is generated in the second order mode. For a parametric oscillator, if the pump wave propagates in the fundamental mode, the signal and idler waves are generated in the higher order mode. As mentioned above, the electrical source may be omitted as the phase-matching conditions can be attained by heating the converter at an appropriate temperature.

Theoretical Background: The Second Harmonic Generation

Second Harmonic Generation (SHG) is a well-known phenomenon in the art of fiber optics. A complete description of this phenomenon can be found in a textbook by Zernike, M. S., et al., Applied Nonlinear Optics, J.Wiley, New York, 1973. A review of SHG in connection with lithium niobate is also found in the aforementioned Raüber article. This review can be summarized as follows.

When a light wave of frequency $\omega_1$ penetrates a nonlinear medium, the output may also contain higher harmonics, $\omega_1 + 2\omega_1 + 3\omega_1 + \ldots$. Having regard to the $2\omega_1$ term, this effect is called "second harmonic generation" (SHG). Under certain conditions, energy from light wave $\omega_1$ can be fed into two beams of lower frequency, $\omega_1 \rightarrow \omega_2 + \omega_3$. This effect is called "parametric oscillation." If two light beams with frequencies $\omega_1$ and $\omega_2$ are allowed to interact in the medium, sum and difference frequencies, $\omega_4 = \omega_1 + \omega_2$ and $\omega_3 = \omega_1 - \omega_2$, are observed in the output. This effect is called "frequency mixing." If the two light beams have very different frequencies, $\omega_1 >> \omega_2$, the sum and difference frequencies are side bands of $\omega_1$, of frequency $\omega_1 \pm \omega_2$. This effect is called "up-conversion of $\omega_2$."

All the described effects have been extensively studied in LiNbO$_3$.

The relation between the field components of the basic wave at $\omega_1$ and the induced second order polarization $P_i$ can be written as $$P_i = d_{ijk} E_j E_k$$

where $d_{ijk}$ is the tensor linking the polarization vector P to the electric field E. As the tensor $d_{ijk}$ is symmetric in j and k, these two subscripts can be contracted. Due to the symmetry of point group 3m, the $d_{ij}$ matrix is analogous to the piezoelectric matrix, $$\begin{vmatrix} 0 & 0 & 0 & 0 & d_{15} & -d_{22} \\ -d_{22} & d_{22} & 0 & d_{15} & 0 & 0 \\ d_{31} & d_{31} & d_{33} & 0 & 0 & 0 \end{vmatrix}$$

There is common agreement that a further symmetry rule, the Kleinman symmetry rule, applies to the case of LiNbO$_3$, reducing the number of independent coefficients to three. For point group 3m, this rule states that $d_{15}$ is equal to $d_{31}$, if there is no strong dispersion between $\omega$ and $2\omega$.

The components of SHG polarization can now be expressed as follows, in matrix notation:

$$\begin{vmatrix} P_x \\ P_y \\ P_z \end{vmatrix} = \begin{vmatrix} 0 & 0 & 0 & 0 & d_{15} & -d_{22} \\ -d_{22} & d_{22} & 0 & d_{15} & 0 & 0 \\ d_{31} & d_{31} & d_{33} & 0 & 0 & 0 \end{vmatrix} \begin{vmatrix} E_x^2 \\ E_y^2 \\ E_z^2 \\ 2E_y E_z \\ 2E_x E_z \\ 2E_x E_y \end{vmatrix}$$

The resulting second order polarizations are $$P_x = 2d_{31} E_x E_z - 2d_{22} E_x E_y$$

$$P_y = -d_{22} E_x + d_{22} E_y + 2d_{31} E_y E_z$$

$$P_z = d_{31} E_x^2 + d_{31} E_y^2 + d_{33} E_z^2$$

Power conversion from the polarization wave to the second harmonic wave is optimal if both waves are in phase. This means that both waves must see the same index of refraction. This is, in general, not possible for two waves of different frequency because of the dispersion of the medium. However, if the polarizing wave is an ordinary ray and the frequency doubled beam is extraordinary, birefringence is able to compensate for the dispersion. This is true for LiNbO$_3$, which has a rather high negative birefringence.

Exact matching of the phases of the two rays can be accomplished by the proper choice of the incident angle (angle tuning), or by temperature variations (temperature tuning). If the incident beam is supposed to be an ordinary ray, and the $2\omega$ beam to be extraordinary, then the above relations simplify to $$P_e = d_{eff} E_0^2$$

where $$d_{eff} = d_{31} \sin\theta - d_{22} \cos\theta \cdot \sin 3\psi$$

In this equation, $\theta$ is the angle of the incident beam with respect to the $+z$ direction, $\psi$ counts from the $+x$ axis to the $+y$ axis. Thus, for the x-y plane ($\psi = 0$) and for the x-y plane ($\theta = 90°$), only $d_{31}$ is valid. In the y-z plane, both terms are effective, but depending on the quadrant ($\theta = +90°$ or $-90°$), the two terms subtract or add. A method to determine the sign of the respective coefficients can easily be derived from this behavior.

SHG was already demonstrated in 1964 for LiNbO$_3$ by Boyd, et al., in "An efficient phase matchable nonlinear optical material," *Applied Physics Letters*, 5, 1964, 234. These authors used angle phase matching of a 1.152 $\mu$m He-Ne laser. Miller, et al., in "Temperature dependence of the optical properties of ferroelectric LiNbO$_3$ and LiTaO$_3$," *Applied Physics Letters*, 5, 1964, 234, accomplished this type of phase matching by adjusting the refractive indices via temperature variation.

In the course of evaluating the noncritical phase matching of LiNbO$_3$, it has been recognized that the phase matching temperature $T_{pm}$ changes from crystal to crystal, and is not at all constant in one crystal. These inhomogeneities have been attributed to changes in composition.

Optical damage is a big problem in applications where light in the short wavelength region of the visible is used. Methods to avoid laser damage have been proposed by choosing high values of $T_{pm}$ by a proper choice of composition. Similar effects can be obtained by additions of MgO to the melt.

Coupled Mode Theory

The purpose of this section is to provide a mathematical basis for the devices of the present invention described above. The formalism is based on coupled mode theory.

Complete mode conversion from the fundamental to the second order mode can be achieved only in a truly two-mode fiber, that is, a fiber with a V-number between 2.405 and 3.832. Thus far, the lowest V-number for the MgO:LiNbO$_3$ fibers used in the preferred embodiments of the present invention is 15, even though in the future, it is expected that optical fibers can be manufactured with a V-number between 2.405 and 3.832. Consequently, when applying an external electric field to one of these fibers, a fraction of the power initially in the fundamental mode is coupled to higher order modes, other than the second order mode. Coupling to these higher order modes can however be made very small.

The amplitude coupling coefficients corresponding to coupling from the fundamental to higher order modes is calculated in a first step. In a second step, the coupled mode equations are solved for a particular case of interest.

The amplitude coupling coefficient $D_{mn,jk}$ between mode (mn) and mode (jk) in an optical fiber, due to a perturbation in the refractive index is given by $$D_{mn,ji} = iK^2 \int (n(x,y,z)^2 - \bar{n}(x,y)^2)\Psi_{mn}(x,y)\Psi_{jk}(x,y)dA \quad (13)$$

where $i = \sqrt{-1}$, $K = 2\pi/\lambda$ is the wavenumber, $\bar{n}(x,y)$ is the index profile of the unperturbed, translationally invariant waveguide (typically a single-crystal fiber), $n(x,y,z)$ is the perturbed index profile that causes coupling between the modes with transverse electric fields $\Psi_{mn}$ and $\Psi_{jk}$. The integral is performed over the fiber cross section.

Assuming an elliptical parabolic index profile, which is a good approximation to the profile of Mg-clad, a-axis LiNbO$_3$ fibers, the transverse electric field can be written as:

$$\psi_{mn} = \frac{1}{\sqrt{N_m N_n}} H_m(w_x) H_n(w_y) \exp\left[-\frac{w_x^2 + w_y^2}{2}\right] \quad (14)$$

where $$w_x = \frac{xV_x^{\frac{1}{2}}}{\rho_x} = \frac{x}{\sqrt{A}}$$

$$w_y = \frac{yV_y^{\frac{1}{2}}}{\rho_y} = \frac{y}{\sqrt{A}}$$

$$N_m = \sqrt{A\pi}\ 2^n n!$$

$$A = \frac{\rho_x \rho_y}{V_x^{\frac{1}{2}} V_y^{\frac{1}{2}}} = \frac{\rho_x^2}{V_x} = \frac{\rho_y^2}{V_y}$$

$$V_x = \frac{2\pi\rho_x}{\lambda}\sqrt{n_{co}^2 - n_{cl}^2}$$

$$V_y = \frac{2\pi\rho_y}{\lambda}\sqrt{n_{co}^2 - n_{cl}^2}$$

and, x and y are the coordinates, $H_i$ is the $j^{th}$ Hermite polynominal, $\rho_x$ and $\rho_y$ are the half axes of the fiber elliptical cross section, n and m are non-negative integers. In this equation the weak-guidance approximation is implicit. The weak-guidance approximation is valid for a fiber with Mg in-diffused cladding, since the maximum refractive index difference across the fiber cross section is only typically 0.0065.

The refractive index perturbation due to the external field is, $$n(x,y,z)^2 - \bar{n}(x,y)^2 \simeq 2\bar{n}(x,y)\Delta\eta(y) = 2\bar{n}\begin{cases} -\Delta \ldots \text{for} \ldots y > 0 \\ +\Delta \ldots \text{for} \ldots y < 0 \end{cases} \quad (15)$$

where $\Delta$ is the index change due to the applied field.

The coupling from the fundamental mode to higher order modes is characterized by the coupling coefficients $D_{00,jk}$. The integral in Equation (13) can be separated in an integral over x and one over y, as follows, $$D_{00,jk} = \frac{iK^2}{\sqrt{N_j N_k}} \int_{-\infty}^{\infty} dy\, 2\bar{n}\, \Delta n(y)\, H_k(w_y) e^{-w_y^2}$$
$$\times \left(\frac{1}{N_0} \int_{-\infty}^{\infty} dx\, H_j(w) e^{-w x^2}\right) \quad (16)$$

The x-integral does not involve the perturbation. As a consequence, it is non-vanishing only for $j=0$ because of mode orthogonality. When $j=0$, it yields $N_0$. The y-integral is non-vanishing only for $k=1,3,5,$ etc. Thus, given the asymmetry of the index perturbation, the fundamental mode couples only to odd higher order modes.

Equation (16) becomes, $$D_{00,0k} = \frac{4iK^2\bar{n}\Delta}{\sqrt{N_0 N_k}} \int_0^\infty dy H_k(w_y) e^{-w y^2} \quad (17)$$

$$D_{00,0k} = \frac{4iK^2\bar{n}\Delta}{\sqrt{2^k \pi k!}} \int_0^\infty dw_y H_k(w_y) e^{-w y^2} \quad (18)$$

The integral in Equation (18) needs to be calculated, namely:

$$Int = \int_0^\infty dw\, H_k(w) e^{-w^2} \quad (19)$$

where the subscript y has been dropped.

By using the expression $$H_k(w) = \frac{1}{2(k+1)} \frac{d}{dw} H_{k+1}(w) \quad (20)$$

and integrating by parts Equation (19), this expression is calculated as:

$$Int = \frac{1}{2(k+1)}\left\{H_{k+1}e^{-w^2}\Big]_0^\infty + 2\int_0^\infty w H_{k+1}(w) e^{-w^2} dw\right\} \quad (21)$$

Using the recursive relation $$wH_{k+1}(w) = \frac{H_{k+2}(w)}{2} + (k+1)H(w) \quad (22)$$

Equation (21) becomes, $$Int = \frac{1}{2(k+1)}\left\{H_{k+1}(0) + \int_0^\infty H_{k+2}(w^2) e^{-w^2} dw\right\} + \int_0^\infty H_k(w) e^{-w} dw \quad (23)$$

Comparing Equations (19) and (23), it becomes apparent that the term within brackets in Equation (23) is equal to zero, i.e., $$\int_0^\infty H_{k+2}(w)e^{-w^2}dw = -H_{k+1}(0) \quad (24)$$

Replacing k+2 by k in the previous expression, the integral Int is:

$$Int = -H_{k-1}(0) \quad (25)$$

Using this result in Equation (18), the coupling coefficients can be calculated:

$$D_{00,0k} = \frac{4iK^2\bar{n}\Delta}{\sqrt{2^k \pi k!}} H_{k-1}(0) \quad (26)$$

Finally, since k−1 is even, using the known expression for $H_{k-1}(0)$, the following equation is deduced:

$$D_{00,0k} = \frac{4iK^2\bar{n}\Delta}{\sqrt{2^k \pi k!}} \frac{(k-1)!}{[(k-1)/2]!} (-1)^{\frac{k-1}{2}} \quad (27)$$

Using Equation (27), the higher-order-mode coupling coefficients $D_{00,0k}$ can be compared with the first-excited-mode coupling coefficient $D_{00,01}$. Table 4 lists the ratios $r_{k,1} = D_{00,0k}/D_{00,01}$.

TABLE 4

| Ratios of Coupling coefficients | |
|---|---|
| k | $r_{k,1}$ |
| 1 | 1 |
| 3 | 0.4082 |
| 5 | 0.2719 |
| 7 | 0.2112 |
| 9 | 0.1742 |
| 11 | 0.1494 |
| 13 | 0.1316 |

It can be noted from Table 4 that the ratio $r_{k,1}$ seems to approach a limiting value different from zero. This fact becomes more evident when examining the ratios $r_{k+2,k}$ $$r_{k+2,k} = \frac{D_{00,0k+2}}{D_{00,0k}} = \frac{1}{(1 + 1/k)^{\frac{1}{2}}(1 + 2/k)^{\frac{1}{2}}} \quad (28)$$

It is clear from Equation (28) that $r_{k+2,k}$ tends to unity for large values of k. Therefore, since $r_{k,1}$ is equal to the product $r_{k,k-2} \times r_{k-2,k-4} \ldots$, it tends to a non-vanishing limit for large values of k. This result seems to indicate that coupling to higher order modes other that the first excited mode (k=1) is non-negligible. However, in power coupling, what counts is the square of the amplitude coupling coefficient divided by the difference in propagation constants. Furthermore, by properly choosing the device length, undesired coupling can be made very small.

The optical electric field in the perturbed waveguide $E_t$ can be expressed as a superposition of the modal fields $e_{t,jk}$ of the unperturbed waveguide as follows, $$\vec{E}_t(x,y,z) = \sum_{j,k} [b_{jk}(z) + b_{-j,-k}(z)]\vec{e}_{t,jk}(x,y) \quad (29)$$

The weak-guidance approximation allows one to work with scalar quantities (linearly polarized field components) instead of vectors (component of the optical electrical field).

The forward-propagating-mode amplitude coefficients $b_{mn}(z)$ obey the following set of differential equations $$\frac{db_{mn}(z)}{dz} - i\beta_{mn}b_{mn}(z) = \quad (30)$$

$$\sum_{j,k} [C_{mn,jk}(z)b_{jk}(z) + C_{mn,-j,-k}(z)b_{-j,-k}(z)]$$

where $$C_{mn,jk}(z) = \frac{D_{mn,jk}(z)}{2iKn_{co}}$$

$\beta_{mn}$ is the modal propagation constant and $D_{mn,jk}$ is the amplitude coupling coefficient defined in Equation (13). A similar set of equations holds for the backward-propagating-mode-amplitude coefficients $b_{-m,-n}(z)$.

In Equations (29) and (30), only guided modes are included.

With the substitutions, $$c_{jk}(z) = b_{jk}(z)e^{-i\beta_{jk}z} \quad (31)$$

$$c_{-j,-k}(z) = b_{-j,-k}(z)e^{i\beta_{jk}z} \quad (32)$$

The coupled mode equations can be written as, $$\frac{dc_{mn}(z)}{dz} = \sum_{j,c} [C_{mn,jk}(z)c_{jk}(z)e^{-i(\beta_{mn}-\beta_{jk})z} + \quad (33)$$

$$C_{mn,-j,-k}(z)e^{-i(\beta_{mn}+\beta_{jk})z}]$$

A similar equation holds for the backward-propagating modes.

The system of Equations (33) can be solved for the case of weak coupling, i.e., when $c_{00}(z) \approx c_{00}(0) \gg c_{jk}(z)$ for any $\{j,k\} \neq \{0\}$. Moreover, the coupling to backward-propagating modes is neglected. Under these conditions Equation (33) reduces to, $$\frac{dc_{mn}(z)}{dz} = C_{mn,00}(z)c_{00}(0)e^{-i(\beta_{mn}-\beta_{00})z} \quad (34)$$

The solution of Equation (34) is given by the Fourier Transform of the coupling coefficient, evaluated at the spatial frequency equal to the difference of the modal propagation constants. The integration of this equation yields:

$$c_{mn}(1) = c_{00}(0)\int_0^1 C_{mn,00}e^{-i(\beta_{mn}-\beta_{00})z}dz \quad (35)$$

$$= c_{00}(0)C_{mn,00}\frac{1 - e^{-i(\beta_{mn}-\beta_{00})1}}{-i(\beta_{mn}-\beta_{00})}$$

where 1 is the interaction (or device) length.

From Equation (35), it can be deduced that the ratio of the power in mode (m,n) to the power in the fundamental mode is given by, $$\frac{|c_{mn}(1)|^2}{|c_{oo}(0)|^2} = |c_{mn,oo}|^2 \frac{\sin^2\left(\frac{\beta_{mn} - \beta_{oo}}{2}\right) l}{\left[\frac{(\beta_{mn} - \beta_{oo})}{2}\right]^2} \quad (36)$$

While preferred embodiments of this invention have been disclosed herein, those skilled in the art will appreciate that changes and modifications may be made therein without departing from the spirit and scope of this invention, as defined in the appended claims.

TABLE 2
ANNEX A

| Configuration | Direction of Propagation | Direction of the Applied E-Field | Eigenvalues of the b Tensor | Phase Difference Between Eigenpolarizations |
|---|---|---|---|---|
| 1 | c axis | x or y axes | $b_1 = \frac{1}{n_0^2} + r_{22}E_i^{(1)}$ | $\frac{2\pi}{\lambda} n_0^3 r_{22} \frac{LV}{d}$ |
|  |  |  | $b_2 = \frac{1}{n_0^2} - r_{22}E_i$ |  |
| 2 | x axis | c axis | $b_1 = \frac{1}{n_e^2} + r_{33}E_z$ | $\frac{2\pi}{\lambda} L[(n_0 - n_e)$ |
|  | or |  |  |  |
|  | y axis | c axis | $b_2 = \frac{1}{n_0^2} + r_{13}E_z$ | $-\frac{V}{2d}(n_0^3 r_{13} - n_e^3 r_{33})]$ |
| 3 | x axis | y axis | $b = \frac{1}{2}\left(\frac{1}{n_0^2} + \frac{1}{n_e^2}\right)$ | $\frac{2\pi L}{\Delta\lambda}[(n_0 - n_e)$ |
|  | y axis | x axis | $\pm \sqrt{\frac{1}{4}\left(\frac{1}{n_0^2} - \frac{1}{n_e^2}\right)^2 + r_{42}^2 E_i^2} \quad (2)$ | $+ \frac{n_0^2 n_e^2}{2} r_{42}^2 \frac{v^2}{d^2}]^{(3)}$ |

Configurations for an Amplitude Electro-Optic Modulator:
[1] i stands for x or y.
[2] $E_i = E_z$ for propagation along y, $E_i = E_y$ for propagation along x.
[3] It is assumed that $2r_{42}E_i << 1/n_e^2 - 1/n_0^2$.
V is the applied voltage, d the electrode separation and L the crystal length.

It is clear from Equation (36), that power coupling is significative only to modes having propagation constants close to that of the fundamental mode and, that this coupling goes as the square of the amplitude coupling coefficient. Furthermore, it is always possible to minimize an undesired coupling by an appropriate selection of the interaction length l.

The more general case of arbitrary-strength coupling can also be solved in an exact manner starting with the system of Equations (30). For the bi-domain fiber devices, the amplitude coupling coefficients $C_{mn,jk}$ are not functions of z. Therefore, Equation (30) is a system of coupled, ordinary, first order differential equations with constant coefficients. The system can be solved by writing the equivalent system of first order algebraic equations, and finding the eigenvalues and eigenvectors of the associated matrix. The resulting eigenvalues are complex instead of real, and the exponential solutions have an oscillatory part, as the solution Equation (35) does have.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced with their scope.

What is claimed and desired to be secured by United States Letters Patent is:

1. An apparatus, comprising:
   an optical waveguide comprising a material having electro-optic properties, said optical waveguide including a first domain and a second domain, said domains collectively supporting a first optical propagation mode and a second optical propagation mode for optical energy propagating in said waveguide, said modes corresponding to first and second energy distribution patterns; and
   a generator for producing a perturbation in the refractive index of one of said domains relative to the refractive index of the other of said domains of said optical waveguide, said perturbation altering the energy distribution of said optical energy to shift at least a portion of said optical energy from one of said patterns to the other of said patterns.

2. An apparatus, comprising:
   a single crystal optical waveguide, said optical waveguide comprising lithium niobate, said optical waveguide providing first and second optical propagation modes for an optical signal propagating therein, said first and second optical propagation modes corresponding to first and second energy distribution patterns, said optical waveguide further comprising a bi-domain structure partitioning said optical waveguide in a first domain and in a second domain; and
   a generator electrically perturbing the refractive index of said optical waveguide in said first domain relative to the refractive index of said second domain, said electrically induced perturbation being selected to cause a phase shift of light in said first domain relative to the light in said second domain so that at least a portion of the energy of said optical signal is transferred from one of said energy distribution patterns to the other.

3. The apparatus as claimed in claim 2, additionally comprising a second optical waveguide coupled to input light to said optical waveguide, said second optical waveguide being a single-mode optical waveguide.

4. The apparatus as claimed in claim 3, additionally comprising a third optical waveguide coupled to receive light from said optical waveguide, said third optical waveguide being a bimodal optical waveguide.

5. The apparatus as claimed in claim 4, wherein said second and third optical waveguides are polarization maintaining waveguides.

6. The apparatus as claimed in claim 2, wherein said perturbational generator comprises an electrical source for applying an electrical field within said single crystal waveguide.

7. The apparatus as claimed in claim 6, further comprising a plurality of electrodes for applying said electrical field to said single crystal waveguide.

8. The apparatus as claimed in claim 2, wherein said first and second domains are substantially of equal volume and are determined by the ferroelectric properties of the material of said single crystal optical waveguide.

9. The apparatus as claimed in claim 2, wherein said single crystal waveguide is an a-axis grown fiber.

10. The apparatus as claimed in claim 6, wherein said electric field produced by said electrical source induces a $+\pi/2$ phase retardation in said first domain and a $-\pi/2$ retardation in said second domain, so that the amplitudes of the energy distribution patterns in said first and second domains have opposite signs.

11. The apparatus as claimed in claim 2, wherein said first optical propagation mode corresponds to the fundamental mode and said second optical propagation mode corresponds to the second order mode.

12. The apparatus as claimed in claim 2, wherein said single crystal waveguide is oriented so as to use the largest electro-optic coefficient of lithium niobate.

13. The apparatus as claimed in claim 6, wherein said electric field produced by said electrical source induces phase retardations which are odd multiples of $\pi/2$.

14. The apparatus as claimed in claim 2, additionally comprising an output waveguide for receiving light from said optical waveguide, said output waveguide being connected to one of said first and second domains, said perturbational generator alternatively changing the direction of the perturbation so that said apparatus functions as an optical switch.

15. The apparatus as claimed in claim 14, wherein said second propagation mode has at least one lobe and said output waveguide is a single-mode waveguide sized so that the fundamental mode supported by said output waveguide matches the size of said at least one lobe of said second propagation mode.

16. The apparatus as claimed in claim 14, further comprising a multimode input waveguide for launching said optical signal into said single crystal optical waveguide.

17. The apparatus as claimed in claim 14, wherein the switch frequency of said apparatus is determined by said perturbational source and is in the GHz range.

18. The apparatus as claimed in claim 6, wherein said electrical source induces phase retardations of $\pm \pi/4$ for light in said first and second domains respectively.

19. The apparatus as claimed in claim 6, wherein said electrical source induces phase retardations selected such that said apparatus operates as an amplitude modulator.

20. The apparatus as claimed in claim 1, wherein said perturbation produces heat, said single waveguide being heated to a phase matching temperature so that second harmonic generation occurs in said optical waveguide.

21. The apparatus as claimed in claim 1, wherein the optical energy input to said optical waveguide is at an input frequency $\omega$ and the energy output from said optical waveguide is at a frequency twice the input frequency.

22. The apparatus as claimed in claim 21, wherein said perturbational generator also comprises an AC electrical source so that said apparatus operates as an optical switch.

23. The apparatus as claimed in claim 22, wherein the switch frequency of said apparatus is determined by said perturbational generator and is in the GHz range.

24. The apparatus as claimed in claim 22, wherein said second propagation mode has at least one lobe and said output waveguide is a single-mode waveguide sized so that the fundamental mode supported by said output waveguide matches the size of said at least one lobe of said second propagation mode.

25. The apparatus as claimed in claim 22, further comprising a multimode input waveguide for launching said optical signal into said signal crystal optical waveguide.

26. The apparatus as claimed in claim 6, wherein said electrical field has a voltage given by the following equation:

$$V = \frac{\lambda}{2n_e^2 r_{33}} \frac{d}{L}$$

27. The apparatus as claimed in claim 6, wherein said single crystal waveguide is a crystal fiber and comprises a longitudinal axis, an a-axis and a c-axis orthogonal to each other, and wherein the longitudinal axis of said single crystal fiber is parallel to the a-axis of said single crystal fiber, the electrical field being collinear to the c-axis of said fiber.

28. A method of coupling optical energy in an optical waveguide, comprising the steps of:
providing a single crystal waveguide having electro-optic properties, said single crystal waveguide comprising a first and a second domain having first and second refractive indices, respectively, said waveguide including at least first and second spatial modes in said first and second domains, said first and said second refractive indices being equal when no perturbation is applied within said single crystal waveguide and changing differently upon applying a perturbation in said single crystal waveguide;
inputting a first optical signal having a first frequency into said single crystal waveguide, so that the first optical signal propagates in said first mode in said first domain and in said first mode in said second domain; and
perturbing the refractive index in said first and second domains to provide an output optical signal propagating at least in said second propagation mode.

29. A method of coupling optical energy in an optical waveguide as claimed in claim 28, wherein the step of perturbing the refractive index comprises the step of applying an electrical perturbation.

30. A method of coupling optical energy in an optical waveguide as claimed in claim 28, further comprising the step of inducing a $+\pi/2$ phase retardation in said first domain and a $-\pi/2$ retardation in said second domain, so that a total relative phase shift of $\pi$ is obtained between said first and second domains.

31. A method of coupling optical energy in an optical waveguide as claimed in claim 28, further comprising the steps of:
inducing a $+\pi/4$ phase retardation in said first domain and a $-\pi/4$ retardation in said second domain; and
alternately changing the direction of the electrical perturbation, so that conversion is partial between said first and second propagation modes, whereby the output optical signal varies in intensity between a maximum and a minimum corresponding to the alternation of the direction of the electrical perturbation.

32. A method of coupling optical energy in an optical waveguide as claimed in claim 28, further comprising the step of selecting phase retardations induced by said perturbation so as to modulate the amplitude of said output optical signal.

33. A method of coupling optical energy in an optical waveguide as claimed in claim 28, further comprising the step of heating said single crystal waveguide to a phase matching temperature so as to produce second harmonic generation in said single crystal waveguide.

34. A method of coupling optical energy in an optical waveguide as claimed in claim 28, further comprising the steps of:
inputting said first optical signal at an input frequency $\omega$ into said single crystal waveguide in said first propagation mode; and
outputting said optical signal at a frequency twice the input frequency $\omega$ and propagating in said second propagation mode.

* * * * *